(12) United States Patent
Itoh

(10) Patent No.: US 6,513,953 B1
(45) Date of Patent: Feb. 4, 2003

(54) ILLUMINATION SYSTEM AND PROJECTOR

(75) Inventor: Yoshitaka Itoh, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/510,678

(22) Filed: Feb. 22, 2000

(30) Foreign Application Priority Data

Feb. 23, 1999 (JP) .......................................... 11-044659

(51) Int. Cl.[7] ............................................. F21V 13/00
(52) U.S. Cl. ........................................ 362/331; 362/19
(58) Field of Search .......................... 362/19, 331, 308; 359/487; 353/20

(56) References Cited

U.S. PATENT DOCUMENTS

| | | | |
|---|---|---|---|
| 5,650,873 A | 7/1997 | Gal et al. ................ | 359/487 |
| 5,751,480 A | 5/1998 | Kitagishi ................ | 359/485 |
| 5,757,547 A | 5/1998 | Rodman et al. ......... | 359/497 |
| 5,978,136 A | * 11/1999 | Ogawa et al. .......... | 359/487 |
| 6,028,703 A | * 2/2000 | Sekine et al. ........... | 359/487 |
| 6,092,901 A | * 7/2000 | Hashizume et al. .... | 362/19 |
| 6,144,492 A | * 11/2000 | Iwamura et al. ....... | 362/19 X |
| 6,201,645 B1 | * 3/2001 | Ohuchi et al. .......... | 362/19 X |

FOREIGN PATENT DOCUMENTS

| | | |
|---|---|---|
| EP | 0 848 274 | 6/1998 |
| EP | 0 867 734 | 9/1998 |
| JP | 5-72417 | 3/1993 |
| JP | 8-160388 | 6/1996 |
| JP | 8-304739 | 11/1996 |
| JP | 10-161065 | 6/1998 |
| JP | 11-202129 | 7/1999 |

* cited by examiner

Primary Examiner—Laura K. Tso
(74) Attorney, Agent, or Firm—Oblon, Spivak, McClelland, Maier & Neustadt, P.C.

(57) ABSTRACT

An illumination system includes a light source that emits unpolarized light, a power variation optical relay system that changes the size of a light beam emitted by the light source, a superposition optical system that effects illumination of an illumination region by an incident light beam, a polarization conversion system that is provided at a selected position along a light path from the incident surface of the power variation optical relay system to the exit surface of the superposition optical system to convert an incident beam of unpolarized light to a light beam having linearly polarized components with one type of polarization direction and emits the converted light beam. The size of a light beam entering the polarization conversion system in a prescribed direction is reduced by the power variation optical relay system. The illumination system includes an integrator optical system and polarization conversion system that uses a light source lamp with a higher output than a conventional lamp, and allows the light output to be increased without decreasing the utilization efficiency of the illumination system.

22 Claims, 24 Drawing Sheets

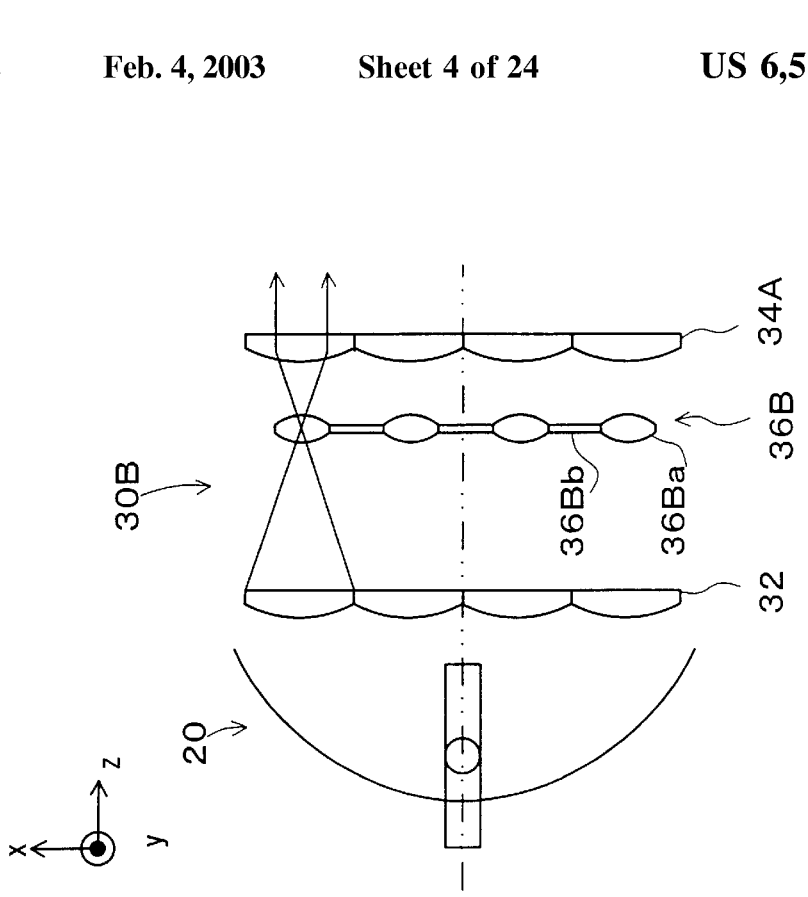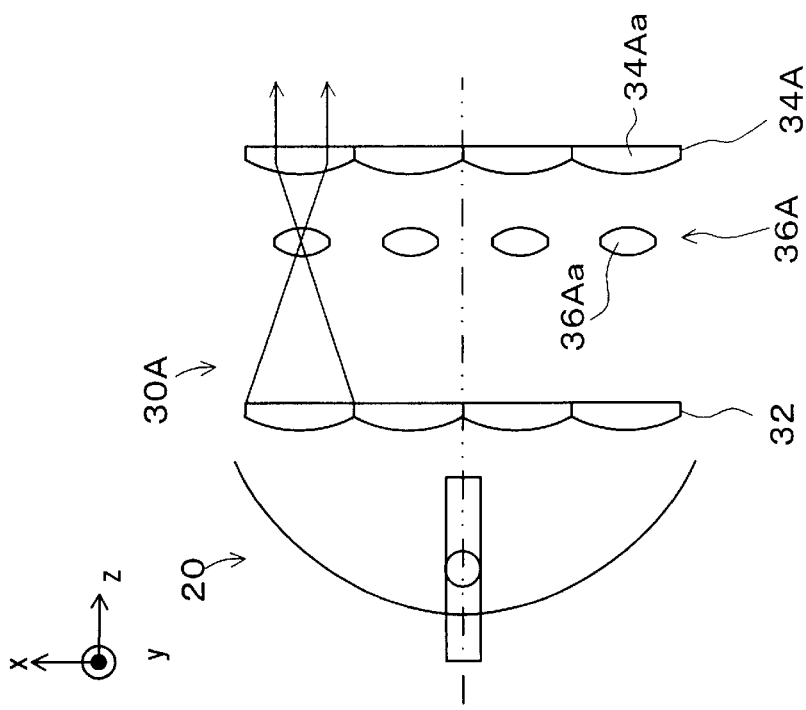

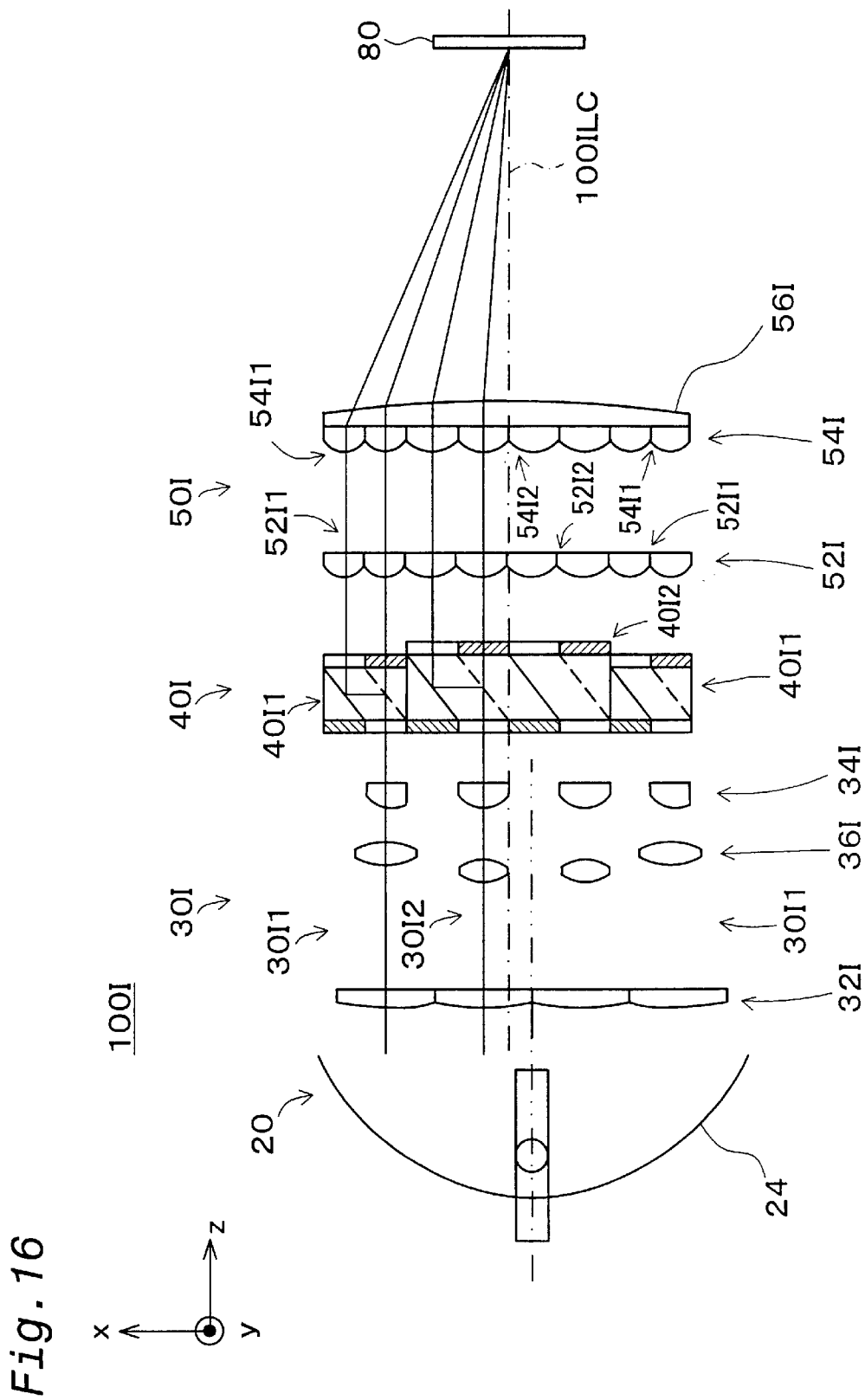

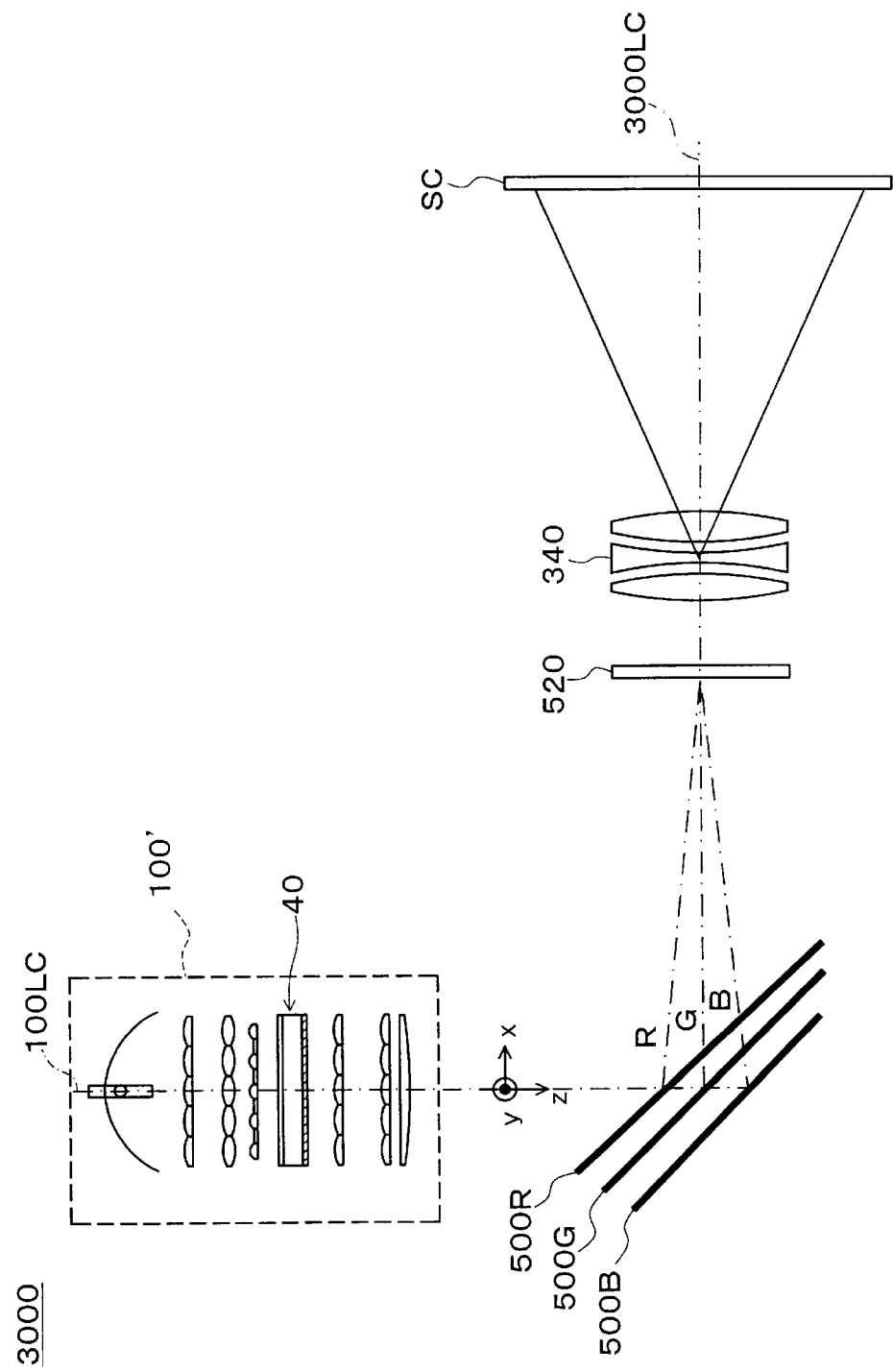

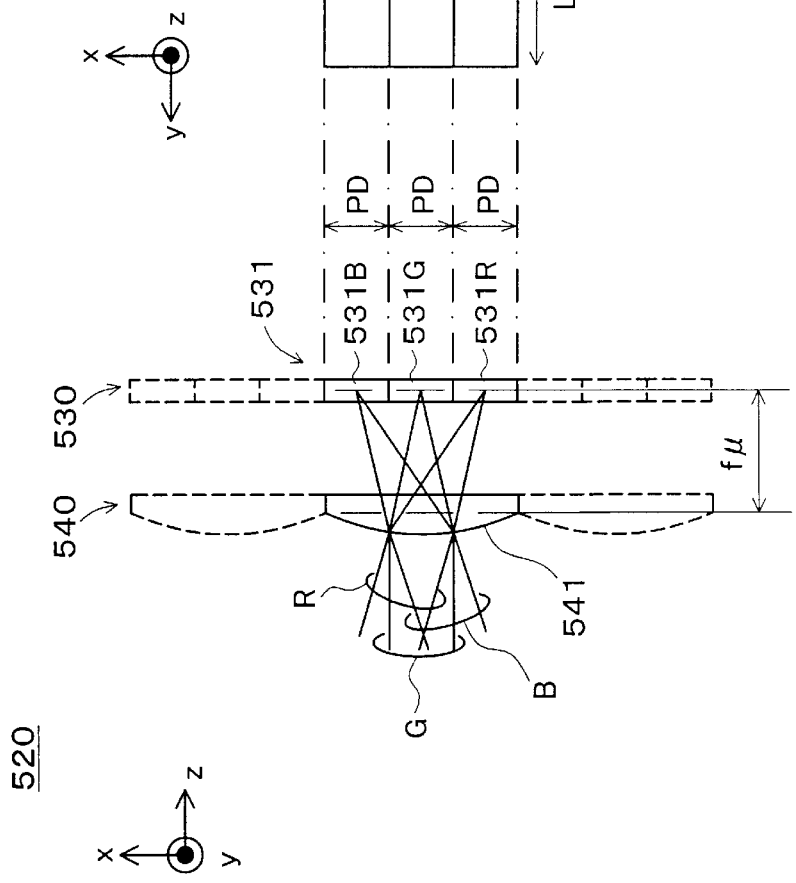

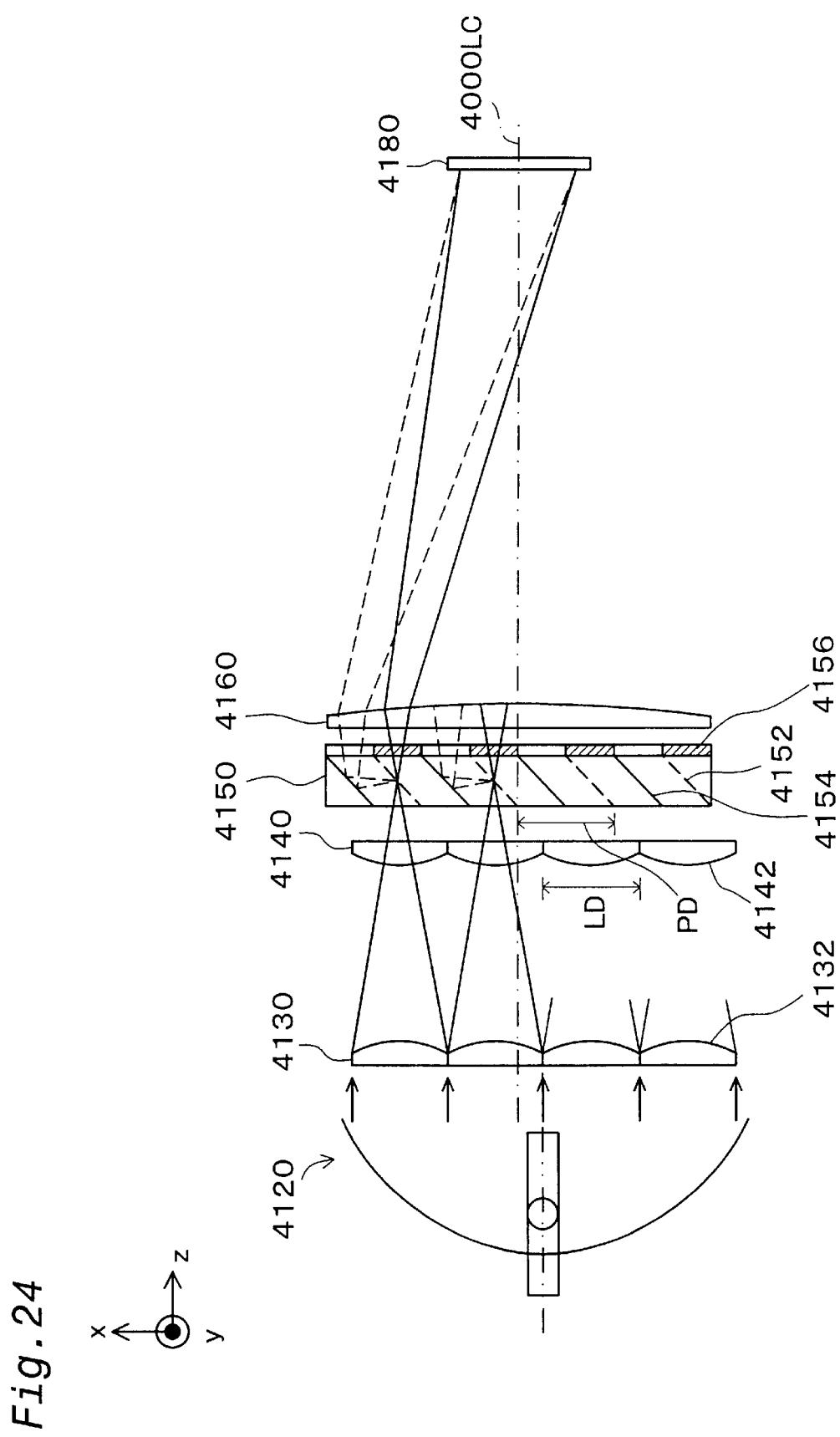

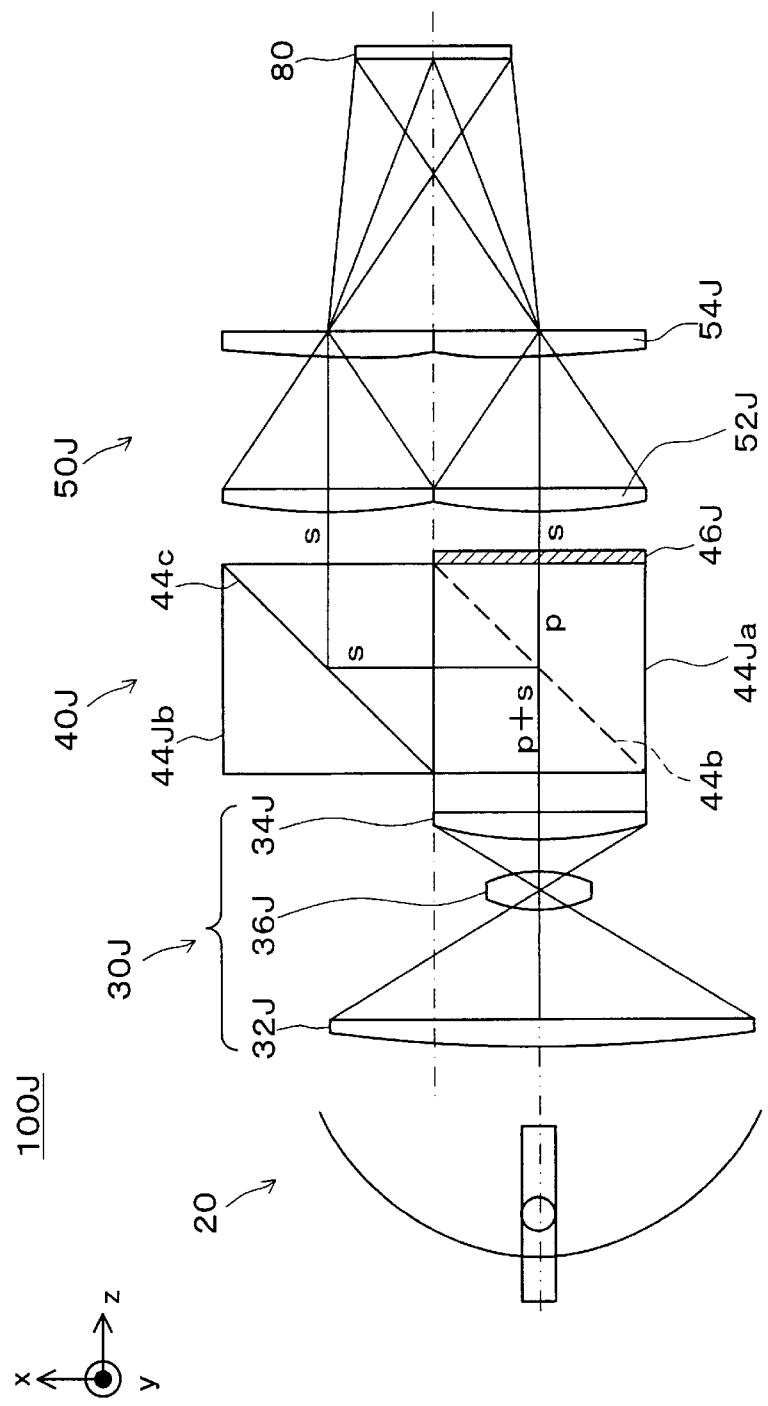

ILLUMINATION SYSTEM AND PROJECTOR

BACKGROUND OF THE INVENTION

1. Field of the Invention

This invention relates to an illumination system that splits light from a light source into a plurality of light beams, converts the light beams to one type of polarized light in which the polarization is substantially in one direction, and superposes these beams of light on the same illumination region. The invention also relates to a projector that by using the illumination system is able to display images with uniform brightness.

2. Description of the Related Art

In a projection display system apparatus, light projected onto electro-optical devices called light valves is modulated in accordance with image information and the light thus modulated is projected onto a screen to thereby display images. Liquid crystal panels (liquid crystal light valves) are the electro-optical devices usually employed. It is desirable that images displayed by a projection display system be uniform and bright, and that the light emitted by the illumination system employed in the apparatus have a high utilization efficiency. Conventionally, integrator optical systems are used to ensure uniform illumination of a region by liquid crystal light valves. Also, in projectors employing liquid crystal light valves that use modulation of just one type of linearly polarized light, in order to raise the light utilization efficiency, a polarization conversion system is used to convert unpolarized light from the light source to one type of linearly polarized light.

FIG. 24 shows the configuration of a conventional illumination system. This illumination system comprises a light source 4120, a first lens array 4130, a second lens array 4140, a polarization conversion system 4150 and a superposition lens 4160. The two lens arrays 4130 and 4140 and the superposition lens 4160 constitute an integrator optical system.

The first lens array 4130 has a plurality of small lenses 4132. The second lens array 4140 has a plurality of small lenses 4142 corresponding to the plurality of small lenses 4132 of the first lens array 4130.

The polarization conversion system 4150 has a plurality of pairs of the polarization splitting film 4152 and reflecting film 4154 arrayed in parallel along the x axis. The polarization splitting film 4152 and reflecting film 4154 have a fixed slant in the direction of the x axis that inclines counterclockwise when viewed from the z axis. The exit side of each polarization splitting film 4152 is provided with a λ/2 retardation film 4156.

Substantially parallel light emitted by the light source 4120 is divided into a plurality of partial light beams by the plurality of small lenses 4132. The condensing action of the small lenses 4132 and 4142 converges each of the partial light beams in the vicinity of the polarization splitting film 4152 of the polarization conversion system 4150. The polarization splitting film 4152 transmits virtually all of one linearly polarized light component, such as p polarized light, for example, while reflecting virtually all of the other linearly polarized light components, such as s polarized light, for example. The linearly polarized light component reflected by the polarization splitting film 4152 is reflected by the reflecting film 4154 onto the superposition lens 4160. The linearly polarized light component transmitted by the polarization splitting film 4152 falls incident on the λ/2 retardation film 4156, is converted to linearly polarized light having the same polarization direction as the other linearly polarized light component, and falls incident on the superposition lens 4160. Thus, the multiple partial light beams incident on the superposition lens 4160 are converted into substantially one type of linearly polarized light and substantially superposed at the illumination region 4180. This enables the illumination region 4180 to be illuminated substantially uniformly by substantially one type of linearly polarized light.

In the above conventional illumination system, the partial light beams formed by the first lens array 4130 are converged in the vicinity of the polarization splitting film 4152, and as a result, the partial light beams that fall incident on the polarization splitting film 4152 are spatially separated. The reflecting film 4154 is positioned where there are no partial light beams, and reflects linearly polarized light reflected by the polarization splitting film 4152. In this way, unpolarized light emitted by the light source is separated into two types of linearly polarized light by the polarization splitting film 4152 and the reflecting film 4154.

If the light source 4120 emits a perfectly parallel beam, the partial light beams will be converged to substantially a point in the vicinity of the polarization splitting film 4152. However, if in practice the beam from the light source 4120 is not perfectly parallel, the image will be formed with some degree of divergence. The width of the polarization splitting film 4152 and reflecting film 4154 along the x axis is set so that almost all of the light used to form the image falls effectively on the polarization splitting film 4152.

An effective way of obtaining a brighter image with a projector is to increase the output of the light source lamp. Light source lamps that are used include metal halide lamps and mercury lamps. To increase the light output it is preferable to use a lamp having a long arc. Usually, however, the beam emitted by a long-arc lamp is less parallel than a beam emitted by a short-arc lamp. This means that even if a short-arc lamp used in an illumination system is simply replaced by a long-arc lamp, the decreased parallelism of the beam will result in a lower proportion of the light impinging on the polarization splitting film 4152, reducing the polarization splitting efficiency. Thus, the problem is that even when the light source output is increased, there is not much of an increase in the effective output of the light used to illuminate the illumination region.

SUMMARY OF THE INVENTION

An object of the present invention is to provide a technology that, in an illumination system that includes an integrator optical system and polarization conversion system that uses a light source lamp with a higher output than a conventional lamp, allows the light output to be increased without decreasing the utilization efficiency of the illumination system. Another object is to provide a projector that enables a brighter, more uniform projection image to be obtained.

At least part of the above and the other related object are attained by an illumination system that illuminates a light incident surface of an optical device as an illumination region. The system comprises: a light source that emits unpolarized light, a power variation optical relay system that changes a size of a light beam emitted by the light source, a superposition optical system that effects illumination of the illumination region by a given incident light beam, and a polarization conversion system that is provided at a selected position along a light path from an incident surface of the power variation optical relay system to an exit surface of the superposition optical system to convert an incident beam of unpolarized light to a light beam having a linearly polarized component with one type of polarization direction and emits the converted light beam. A size of a light beam entering the polarization conversion system is reduced in a prescribed direction by the power variation optical relay system.

In the illumination system of the present invention the size of a beam of light entering the polarization conversion system can be reduced in a prescribed direction by a power variation optical relay system, thereby improving the incident efficiency of light entering the polarization conversion system. As a result, the illumination region can be brightly and uniformly illuminated by one type of linearly polarized light with substantially uniform directions of polarization. In general, since there is a proportional relationship between the output of a light source lamp and arc length, and the parallelism of the light beam emitted by the light source lamp deteriorates as the arc length increases, when a high output lamp is used there is a decrease in the light incident efficiency with respect to the polarization conversion system. However, in accordance with the configuration of this invention, when a light source lamp having a higher output than a conventional lamp is used, it is possible to increase the brightness of the illuminating light comprised of light polarized in the same direction without decreasing the utilization efficiency of the illumination system. Here, the prescribed direction, with respect to the light beam, means one or two directions orthogonal to the direction of light beam propagation. Therefore when the power variation optical relay system is constituted using an optical condensing element having a uniform power in every direction such as a spherical lens, the size of the beam section is decreased in every direction correspondingly. Also, when the power variation optical relay system is constituted using an optical condensing element having a power in only one direction such as a cylindrical lens, the size of the beam section is decreased in the one direction only.

In accordance with one preferable structure of the optical illumination, the power variation optical relay system includes: a first lens array having a plurality of first small lenses, a relay lens array having a plurality of relay lenses that is disposed on a light emission side of the first lens array, and a second lens array having a plurality of second small lenses that is disposed on a light emission side of the relay lens array. The first lens array and the second lens array are disposed at conjugate points of the relay lens array. The polarization conversion system includes: a polarization beam splitter array that has a plurality of pairs of mutually parallel polarization splitting film and reflecting film in an inclined state along the prescribed direction and separates the incident beam of unpolarized light into a plurality of partial light beams each having two types of linearly polarized light, and a polarization conversion device that converts a polarization direction of a first type of linearly polarized light of the two types of linearly polarized light to a same polarization direction as a second type of linearly polarized light. A light beam entering the polarization conversion device is split by the power variation optical relay system into a plurality of partial light beams, and the size of each of the plurality of partial light beams in the prescribed direction is reduced by the power variation optical relay system.

In this arrangement the power variation optical relay system is constituted by an array of lenses, thereby enabling the incident light efficiency in respect of the polarization conversion system to be improved. If the focus is on improving the incident light efficiency with respect to the polarization beam splitter array, a power variation optical relay system can be employed that uses an optical condensing element curved in one direction such as the cylindrical lens described above.

In this configuration, it is preferable that the superposition optical system includes: a third lens array having a plurality of third small lenses on which the plurality of partial light beams entering the superposition optical system impinge, a fourth lens array having a plurality of fourth small lenses corresponding to the plurality of third small lenses, and a superposition lens that superposes onto the illumination region a plurality of partial light beams passing through the third lens array and the fourth lens array.

Using a superposition optical system configured as described allows virtually all of the light exiting from the polarization conversion system to be guided to the illumination region, thereby improving the light utilization efficiency of the illumination system and enabling the illumination region to be illuminated more uniformly.

The superposition optical system may includes: a third lens array having a plurality of small lenses that superposes the plurality of partial light beams substantially on the illumination region, and a fourth lens array having a plurality of fourth small lenses corresponding to the plurality of third small lenses.

In this case, the angle of incidence of the illuminating beam incident to the illumination region can be made smaller compared to that in a superposition optical system comprised of third and fourth lens arrays and superposition lens. When optical systems and elements in which the optical characteristics depend on the angle of incidence are located in the illumination region, this allows the light utilization efficiency of such systems and elements to be improved. It also serves to reduce the complexity and cost of the illumination system.

In accordance with the above configurations, it is preferable that the polarization conversion system is disposed between the power variation optical relay system and the superposition optical system. The polarization conversion system may be disposed between the relay lens array and the second lens array of the power variation optical relay system. The polarization conversion system may be disposed between the third lens array and the fourth lens array.

Whichever location is used for the polarization conversion system, it is possible to improve the efficiency of light entering the polarization conversion system, as described above. However, the improvement is greater when the polarization conversion system is located between the relay lens array and the second lens array or between the third and fourth lens arrays, than when it is located between the power variation optical relay system and the superposition optical system.

Moreover, when the polarization-conversion system is located between the power variation optical relay system and the second lens array or between the relay lens array and the second lens array of the power variation optical relay system, the second and third lens arrays may be optically integrated.

"Optically integrated" elements mean a combination of optical elements bonded together with adhesive, or a single optical element possessing the functions of multiple optical elements. The functions of the second lens array of the power variation optical relay system and the functions of the third lens array of the superposition optical system may be integrated into either one of the lens array while omitting the remaining lens array. Optically integrating multiple optical elements (the second and third lens arrays) enables optical loss arising at interfaces between the elements to be reduced, thereby improving the light utilization efficiency. It also enables the complexity and cost of the optical system to be reduced.

In accordance with the above configuration, it is preferable that the plurality of first small lenses of the first lens array each has a different optical axis position in a direction perpendicular to the prescribed direction so that a plurality of partial light beams entering the polarization conversion system are mutually adjacent in at least the direction perpendicular to the prescribed direction. "Prescribed direction" means the direction in which, in the polarization conversion system, the multiple sets of alternating polarization splitting film and reflecting film are arranged.

By thus enabling the angle of incidence of the illuminating beam incident to the illumination region to be reduced, when the optical systems and elements are located in the illumination region this allows the light utilization efficiency of such systems and elements to be further improved. It also enables the optical system along the light path from the polarization conversion system to the illumination region to be reduced in size.

In this configuration, a plurality of partial light beams arrayed in the prescribed direction may be each reduced in the power variation optical relay system by a reduction ratio that differs according to an array position of each partial light beam.

This makes it possible to further reduce the angle of incidence of the illuminating beam incident to the illumination region, and, as such, when optical systems and elements in which the optical characteristics depend on the angle of incidence are located in the illumination region, allows the light utilization efficiency of such systems and elements to be further improved.

In accordance with the above configurations, the relay lenses may be constituted by a composite lens comprising at least two lenses.

Constituting the relay lenses as a composite lens enables correction of chromatic aberration, spherical aberration and astigmatism and the like that readily arise in the case of a single lens configuration.

The present invention is also directed to a first projector for displaying projected images. The first projector comprises: any one of the above illumination systems, an electro-optical device that converts light received from the illumination system to light for forming images responsive to image signals and emits the light thus converted, and a projection optical system that projects light emitted from the electro-optical device.

The first projector uses the illumination system of the invention, so that even when a light source lamp is used having a higher output than a conventional lamp, the light output can be increased without decreasing the utilization efficiency of the illumination system. This allows a brighter, more uniform projection image to be obtained. As the first projector of the invention, there can be envisioned a sequential color display system apparatus with a monochrome liquid crystal panel and a time-division system in which color filters or the like able to generate specific colors are used.

The first projector further may comprise: a color separator that separates light emitted from the illumination system into a plurality of color components, a plurality of the electro-optical devices for separately receiving each of the color components separated by the color separator, and a color combiner for combining light of each color component emitted by the plurality of electro-optical devices, wherein the projection optical system projects the combined light emerging from the color combiner.

This arrangement permits brighter, more uniform color projection images to be obtained.

In this configuration, it is preferable that, assuming x, y, z as three mutually orthogonal directional axes where z is a direction parallel to an optical axis of light emerging from the illumination system, the color separator has a color separation surface plane that is substantially perpendicular to plane xz and is inclined by a prescribed angle with respect to plane yz, and the illumination system is positioned so that the prescribed direction in which a plurality of pairs of polarization splitting film and reflecting film included in the polarization conversion system are arrayed is substantially identical to the y direction.

In accordance with this arrangement, the prescribed direction in which the multiple pairs of polarization splitting film and reflecting film are arrayed in the polarization conversion system (hereinafter referred to as the polarization splitting direction) is perpendicular to the direction of color separation in the color separation surface plane of the color separator, so the range of variation of the angle of incidence of the light incident on the color separation surface can be reduced. Since the color separation characteristics of the color separation surface depend on the angle of incidence, reducing the range of variation of the angle of incidence reduces deviation in the colors of light exiting the color separator. As a result, projection images can be obtained that have more uniform brightness and colors.

It is also preferable that, assuming x, y, z as three mutually orthogonal directional axes where z is a direction parallel to an optical axis of light emerging from the illumination system, the color combiner has a color combining surface plane that is substantially perpendicular to plane xz and forms a prescribed angle with respect to plane yz, and the illumination system is positioned so that the prescribed direction in which the plurality of pairs of polarization splitting film and reflecting film are arrayed is substantially identical to the y direction.

In accordance with this arrangement, the prescribed direction in which polarized light is separated in the polarization conversion system is perpendicular to the direction of color combining in the color combining surface plane in the color combiner, thereby enabling the range of variation of the angle of incidence of the light incident on the color combining surface to be reduced. Since the color combining characteristics of the color combining surface depend on the angle of incidence, reducing the range of variation of the angle of incidence reduces deviation in the combined colors leaving the color combining surface. As a result, projection images can be obtained that have more uniform brightness and colors.

The present invention is further directed to a second projector for displaying projected images, comprising: any one of the above illumination systems, a reflecting type electro-optical device that converts incident light to light for forming images responsive to received image signals while reflecting the light, a projection optical system that projects light emitted from the reflecting type electro-optical device, and a polarization splitting device that directs first linearly polarized light emitted from the illumination system toward the reflecting type electro-optical device and also directs toward the projection optical system second linearly polarized light that is received from the reflecting type electro-optical device and that is polarized in a direction perpendicular to the first linearly polarized light.

The second projector also uses the illumination system of the invention, so that even when a light source lamp is used having a higher output than a conventional lamp, the light output can be increased without decreasing the utilization efficiency of the illumination system. Thus, projection images can be obtained that are brighter and have more uniform brightness and colors.

In this configuration, it is preferable that, assuming x, y, z as three mutually orthogonal directional axes where z is a direction parallel to an optical axis of light emerging from the illumination system, the polarization beam splitter element has a polarized light separation surface plane that is substantially perpendicular to plane xz and is inclined by a prescribed angle with respect to plane yz, and the illumination system is positioned so that the prescribed direction in which a plurality of sets of polarization splitting film and reflecting film included in the polarization conversion system are arrayed is substantially identical to the x direction.

When linearly polarized light that within plane yz is inclined in the z direction falls on the color separation surface, the rotation of the polarization axis reduces the utilization efficiency of light utilized in a reflecting type optoelectric apparatus. Since in accordance with the above configuration the range of variation in the angle of incidence of light falling on the polarized light separation surface can be made smaller in plane yz than in plane xz, the polarization axis rotation can be reduced. This results in projection images that are brighter and have higher contrast.

The present invention is also directed to a third projector for displaying projected images, comprising: any one of the above illumination systems, an electro-optical device that includes a plurality of pixels each including a plurality of sub-pixels corresponding to light of each of a plurality of colors and a condenser optical system comprising a plurality of small condenser lenses corresponding to each pixel. The electro-optical device converts light transmitted by each pixel to light for forming image of each pixel responsive to given image information. The projector further comprises a color separator that separates light emerging from the illumination system into a plurality of colors and also directs light of each of the plurality of color components in a mutually different direction to impinge on the sub-pixels corresponding to the respective color components, and a projection optical system for projecting light emitted from the electro-optical device.

The third projector according to the invention also uses the illumination system of the invention, so that even when a light source lamp is used having a higher output than a conventional lamp, the light output can be increased without decreasing the utilization efficiency of the illumination system, thereby making it possible to obtain projection images that are brighter and have more uniform brightness and colors.

In this configuration, it is preferable that, assuming x, y, z as three mutually orthogonal directional axes where z is a direction parallel to an optical axis of light emerging from the illumination system, the color separator has a plurality of color separation surface planes for selectively separating light into a plurality of color components that is substantially perpendicular to plane xz and is inclined by a different prescribed angle with respect to plane yz, and the illumination system is positioned so that the prescribed direction in which a plurality of pairs of polarization splitting film and reflecting film included in the polarization conversion system are arrayed is substantially identical to the y direction.

In accordance with this arrangement, the direction in which polarized light is separated in the polarization conversion system is perpendicular to the direction of color separation in the color separation surface plane of the color separating optical system, thereby enabling the range of variation of the angle of incidence of the light incident on the color separation surface to be decreased. Since the color separation characteristics of the color separation surface depend on the angle of incidence, reducing the range of variation of the angle of incidence reduces deviation in the colors of light exiting the color separating optical system. As a result, projection images can be obtained that have more uniform brightness and colors.

It is also preferable that the illumination system is positioned so that the prescribed direction in which a plurality of pairs of polarization splitting film and reflecting film are arrayed is substantially identical to a direction that is perpendicular to a direction in which the plurality of sub-pixels of each pixel are aligned.

Since in accordance with this arrangement the direction in which polarized light is separated in the polarization conversion system is perpendicular to the direction in which is arrayed the plurality of color sub-pixels included in each pixel, it is possible to reduce the color shift due to the incident light that is not relevant to each color sub-pixel.

These and other objects, features, aspects, and advantages of the present invention will become more apparent from the following detailed description of the preferred embodiments with the accompanying drawings.

BRIEF DESCRIPTION OF THE DRAWINGS

FIG. 3 is an enlarged view of one set of a first small lens 32a, second small lens 34a and relay lens 36a;

FIGS. 5(A) and 5(B) show variations of the relay lens array 36;

FIG. 16 is a plan view of the general configuration of main parts of an illumination system as an eighth embodiment of the invention;

FIG. 22 is a plan view of the general configuration of main parts of another projector that uses the illumination system of the invention;

FIGS. 23(A) and 23(B) are enlarged depictions of one pixel configuration of the single-panel type color liquid crystal light valve 520;

FIG. 24 shows the configuration of a conventional illumination system;

FIG. 25 is a plan view of the main parts of another illumination system according to the invention.

DESCRIPTION OF THE PREFERRED EMBODIMENTS

Embodiments of the present invention will now be described with reference to the drawings. Also, in each of the following embodiments, unless stated otherwise, the direction of light propagation is set along z axis (the direction parallel to the optical axis), and when an observer is facing the direction of light propagation, his twelve o'clock direction is taken y axis (the vertical direction) and his three o'clock direction as x axis (horizontal direction).

A. First Embodiment

Figure 1:
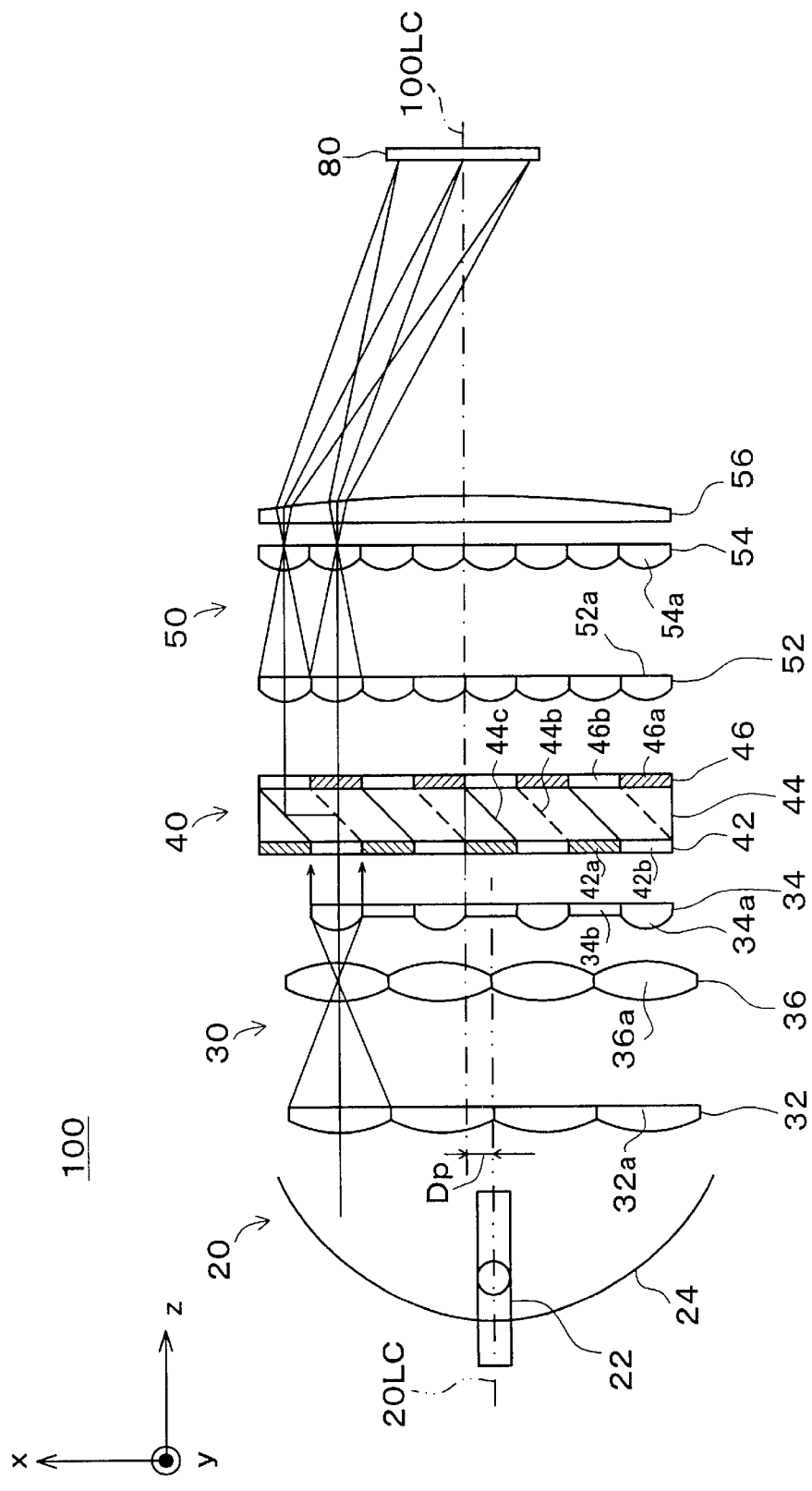
FIG. 1 is a plan view of the general configuration of main parts of an illumination system comprising a first embodiment of the invention.

FIG. 1 is a plan view of the general configuration of main parts of an illumination system comprising a first embodiment of the invention. The illumination system 100 includes a light source 20, a power variation optical relay system 30, a polarization conversion system 40, and superposition optical system 50. The power variation optical relay system 30 is disposed so that the optical axis thereof substantially coincides with the optical axis 20LC of the light source 20. The polarization conversion system 40 and superposition optical system 50 are disposed so that their optical axes coincide with a system optical axis 100LC that passes through the center of an illumination region 80. The light source axis 20LC is shifted parallel to the system optical axis 100LC in the –x direction by a given displacement Dp. The amount of the displacement Dp will be explained later. The superposition optical system 50 constitutes an integrator optical system for illuminating the illumination region 80 substantially uniformly.

The light source 20 has a light source lamp 22, and a concave mirror 24 that reflects the light from the light source lamp 22 as a roughly parallel beam of light. The light source lamp 22 may be a metal halide lamp, a mercury lamp or the like. It is preferable to use a parabolic mirror as the concave mirror 24. An elliptical or spherical mirror or the like may be used instead of a parabolic mirror.

Figure 2:
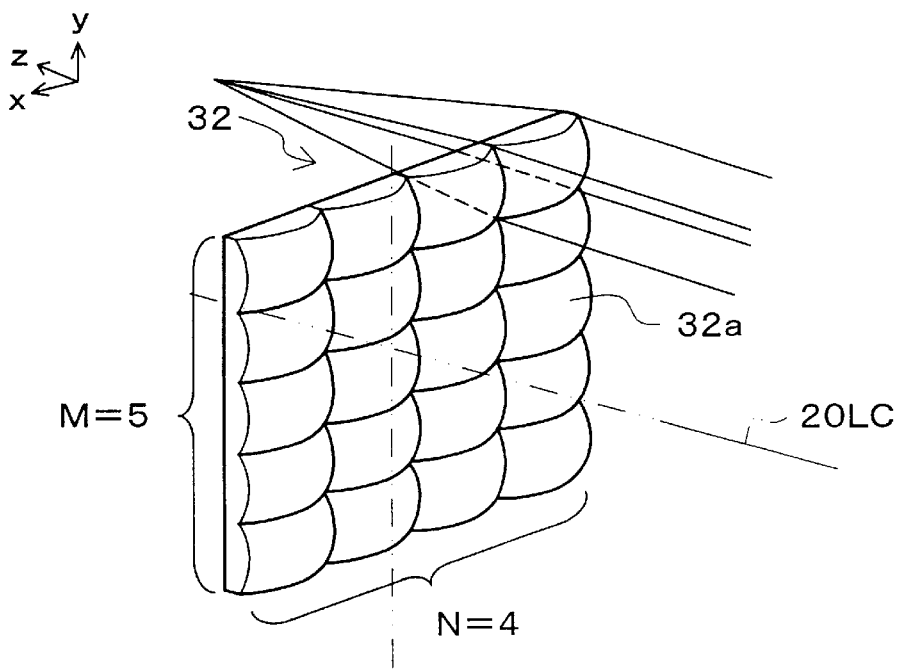
FIG. 2 is a perspective view of the first lens array 32.

The power variation optical relay system 30 includes a first lens array 32, a second lens array 34 and a relay lens array 36. FIG. 2 is a perspective view of the first lens array 32. The first lens array 32 is formed to be a matrix of M rows and N columns of plano-convex first small lenses 32a each has the contour of a substantially rectangular shape. In the example shown in FIG. 2, M=5 and N=4. While the shape of each of the first small lenses 32a, viewed from the z direction, is not limited to the rectangular shape of this example, it is desirable that the lenses be of a shape that enables them to be disposed with no spaces between them. The first small lenses of the first lens array may be given an external shape that corresponds to the shape of the illumination region 80 because, as described later, it is desirable that a light beam that has passed through the first small lenses and been reduced in size by the power variation optical relay system 30 impinges on third small lenses 52a of a third lens array 52, and that the third small lenses 52a has a shape set to correspond to the shape of the area of the illumination region 80 that is actually illuminated. For example, assuming a liquid crystal panel is used as the illumination region, and that the aspect ratio-of its image formation area is 4:3, the aspect ratio of the first small lenses 32a will also be set at 4:3.

The second lens array 34 shown in FIG. 1 is also formed to be a rectangular matrix of M rows and N columns of plano-convex second small lenses 34a corresponding to the first small lenses 32a of the first lens array 32. The second small lenses 34a are smaller than the first small lenses 32a and are linked by flat plate portions 34b so that the second small lenses 34a are spaced apart from each other. It is not essential for the second small lenses 34a to be linked by the flat plate portions 34b. Also, the second lens array 34 may be comprised by second small lenses 34Aa having the same shape as the first small lenses 32a (albeit different optical characteristics).

The relay lens array 36 is comprised of biconvex relay lenses 36a, arranged in a matrix of M rows and N columns, corresponding to the plurality of first small lenses 32a and second small lenses 34a.

Figure 3:
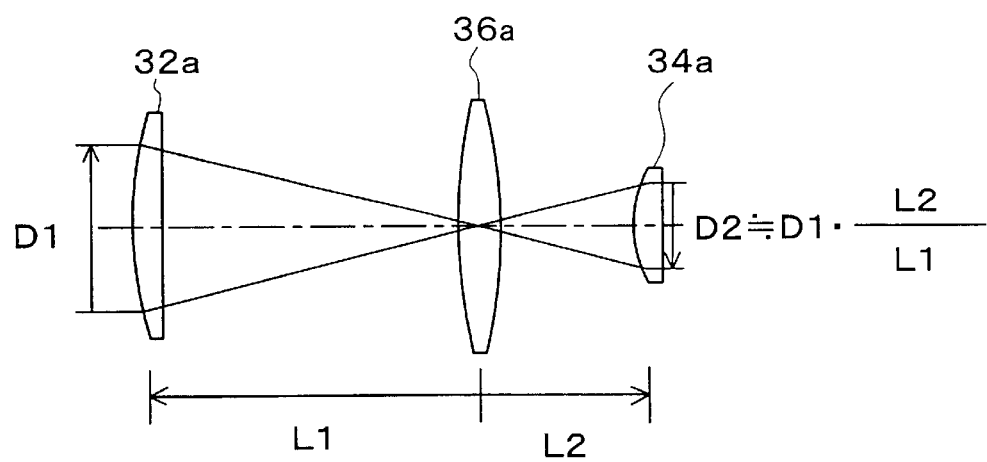

FIG. 3 is an enlarged view of one set of a first small lens 32a, second small lens 34a and relay lens 36a. The first small lens 32a and second small lens 34a are disposed at conjugate points of the relay lens 36a. That is, the focal distance fr of the relay lens 36a is set at $(L1 \times L2)/(L1+L2)$, where L1 is the distance between the first small lens 32a and the relay lens array 36a, and L2 is the distance between the relay lens 36a and the second small lens 34a. The focal distance f1 of the first small lens 32a is set to be L1 and the focal distance f2 of the second small lens 34a is set to be L2.

The partial light beam of width D1 falling on the incident surface of the first small lens 32a is converged by the first small lens 32a to form an image in the relay lens 36a. The light from the image falls incident on the second small lens 34a. The second small lens 34a emits a light beam of width D2. Width D2 is substantially equal to $(D1 \times L2/L1)$. Specifically, the power variation optical relay system 30 has the function of reducing the width D1 of the light beam entering the first small lens 32a by the ratio of distance L2 to distance L1, that is, by (L2/L1). For example, if L2 is set as ½ L1, the power variation optical relay system 30 can make the width D2 of the beam emerging from the second small lens 34a substantially half the width D1 of the beam entering the first small lens 32a. In the following, each of the plurality of light beams formed by the first lens array 32 may also be referred to as a partial light beam or first partial light beam, and each of the plurality of light beams exiting the power variation optical relay system 30 may also be referred to as a reduced partial light beam or second partial light beam.

The relay lens array 36 is not an essential requirement if the light source 20 emits a perfectly parallel light beam that is parallel to the light source axis 20LC. However, light emitted by the light source 20 typically includes light that is not parallel to the light source axis 20LC. When this is the case and the first small lenses 32a and second small lenses 34a are simply lined up, there may be light exiting the first small lenses 32a that cannot enter the second small lenses 34a, thereby degrading the light utilization efficiency of the power variation optical relay system 30. Locating the relay lenses 36a at a position that is a common focal point of the first small lenses 32a and the second small lenses 34a makes it possible for the light that is not parallel to the light source axis 20LC to be guided onto the second small lenses 34a by the refractive power of the relay lenses 36a, thereby improving the light utilization efficiency.

Figure 4A:
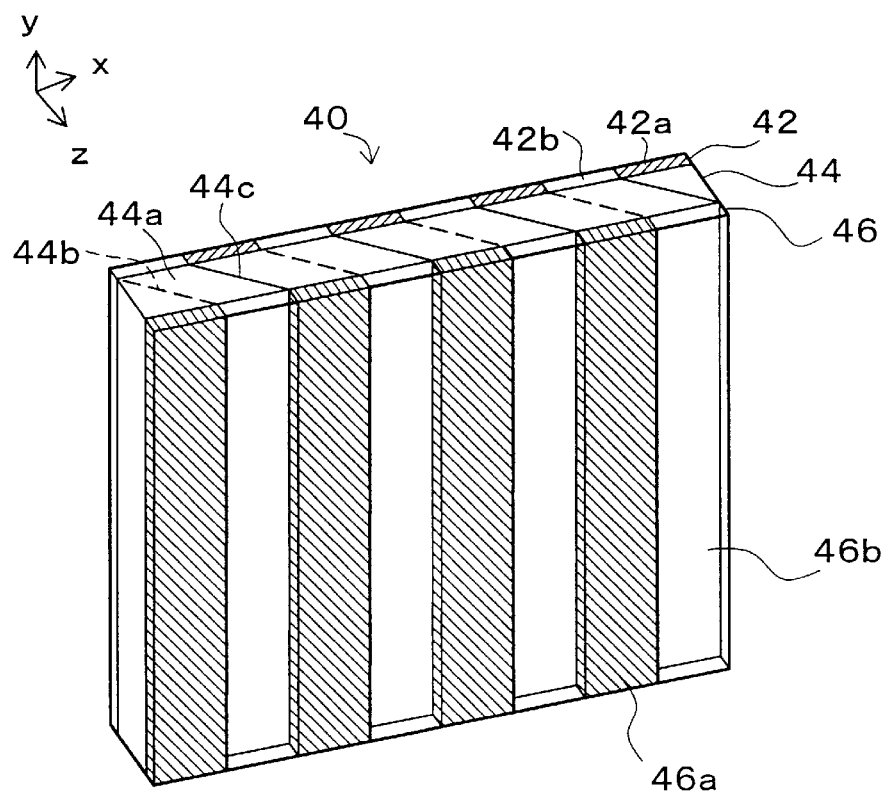
FIGS. 4(A) and 4(B) show the configurations of the polarization conversion system 40.
Figure 4B:
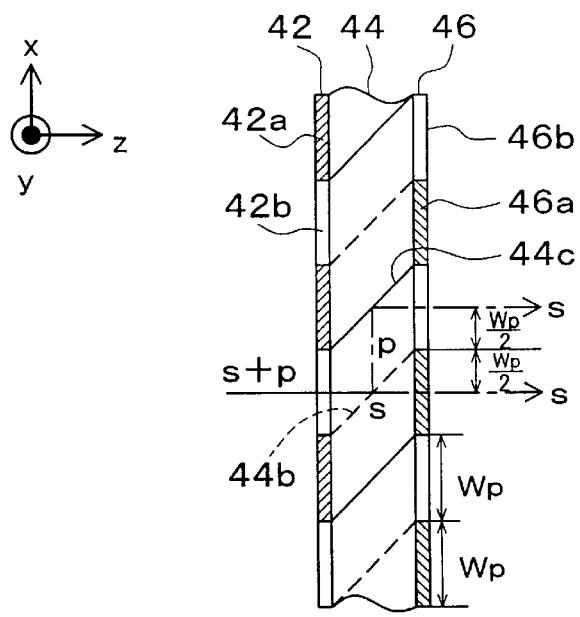

FIGS. 4(A) and 4(B) illustrate the configurations of the polarization conversion system 40, with FIG. 4(A) being a perspective view of the system and FIG. 4(B) being an enlarged plan of a portion thereof. The polarization conversion system 40 includes a light shield plate 42, a polarization beam splitter array 44, and a selective retardation plate 46. The polarization beam splitter array 44 has a configuration obtained by adhering multiple transparent plates 44a mutually having the shape of columns of parallelogram section. Polarization splitting films 44b and reflecting films 44c are formed alternately on the interfaces of the transparent plates 44a. The polarization beam splitter array 44 can be fabricated by adhering together a plurality of sheets of plate glass on which are formed the polarization splitting films 44b and reflecting films 44c to provide the alternating disposition of the films, and then cutting the adhered glass sheets at a prescribed angle. The polarization splitting film 44b may be formed of a dielectric multi-layer film, and the reflecting film 44c may be formed of a dielectric multi-layer film or aluminum film.

As shown in FIG. 4(A), the light shield plate 42 comprises light shielding portions 42a and transparent portions 42b arrayed in a strip-shaped arrangement. Incident light is blocked by the shielding portions 42a and transmitted by the transparent portions 42b. Thus the light shield plate 42 controls the transmission of light. The light shielding portions 42a and transparent portions 42b are arranged so that reduced partial light beams from the second lens array 34 impinge only on the polarization splitting film 44b and not on the reflecting film 44c. As shown in FIG. 4(B), the transparent portions 42b are arranged so that their centers coincide with those of the polarization splitting films 44b, and the width of the transparent portions 42b (the width in the x direction) is set to be substantially the same as the width Wp of the polarization splitting film 44b in the x direction. Therefore, the light shielding portions 42a of the light shield plate 42 block virtually all of the reduced partial light beams that do not pass through the polarization splitting film 44b, so that only light beams that pass through the transparent portions 42b impinge on the polarization splitting film 44b. In this embodiment the light shield plate 42 is a transparent plate (of glass, for example) on which is formed a film with light-shielding properties such as a film of chromium or aluminum, or a dielectric multi-layer film. The light shield plate 42 may be formed using, for example, an aluminum plate provided with light-transmission openings.

The width of the parallel second partial light beams emitted from the second lens array 34 is set by means of the power variation optical relay system 30 to be not more than the width Wp of each transparent portion 42b in the x direction. This ensures that virtually all of a light beam emerging from the second lens array 34 passes through the transparent portion 42b.

An unpolarized light beam that passes through the transparent portion 42b, indicated in FIG. 4(B) by the solid line, impinges on the polarization splitting film 44b of the polarization beam splitter array 44 and is thereby divided into two types of linearly polarized light, s polarized light and p polarized light, indicated by the broken lines. The p polarized light is transmitted unchanged by the polarization splitting film 44b. The s polarized light is reflected by the polarization splitting film 44b, then by the reflecting film 44c, and emerges as a beam having an x direction width of Wp, parallel to the beam of p polarized light. A $\lambda/2$ retardation film 46a is formed on the surface of the selective retardation plate 46 from which the light transmitted by the polarization splitting film 44b exits, while no such $\lambda/2$ retardation film is formed on the transparent layer 46b, which is the surface portion from which light reflected by the reflecting film 44c exits. Accordingly, p polarized light transmitted by the polarization splitting film 44b is converted to s polarized light by the $\lambda/2$ retardation film 46a and exits from the selective retardation plate 46. On the other hand, the polarization state of s polarized light reflected by the reflecting film 44c is virtually unaffected by its transmission through the transparent layer 46b, and therefore exits as s polarized light from the selective retardation plate 46. As a result, substantially all of the unpolarized light that enters the polarization conversion system 40 is converted to s polarized light for emission. Alternatively, the light may be converted and emitted as p polarized light by forming a $\lambda/2$ retardation film 46a on the portion of the selective retardation plate 46 from which light reflected by the reflecting film 44c exits. The polarization splitting film 44b may be formed to transmit s polarized light and reflect p polarized light. In the above explanation, the selective retardation plate 46 corresponds to the polarization conversion device of the claimed invention.

If the unpolarized light impinges directly on the reflecting film 44c, light exiting the polarization conversion system 40 will be p polarized light rather than the desired s polarized light. As described above, in this embodiment the system is adjusted so that virtually all of the plurality of reduced partial light beams emerging from the power variation optical relay system 30 impinge on the polarization splitting film 44b. The light shield plate 42 prevents light impinging on the reflecting film 44c. This prevents unpolarized light impinging on the reflecting film 44c and undesired linearly polarized light (p polarized light, in this example) being emitted by the polarization conversion system 40.

As can be seen in FIG. 4(B), the centers of the two beams of s polarized light exiting the polarization conversion system 40 are shifted in the x direction from the center of the incident unpolarized light (s+p polarized light). The amount of this shift is equal to half the width Wp of the $\lambda/2$ retardation film 46a (that is, half the width of the polarization splitting film 44b in the x direction). Because of this, as shown in FIG. 1, the light source axis 20LC is offset from the system optical axis 100LC of the polarization conversion system 40 by an amount Dp that is equivalent to Wp/2.

As described, the plurality of second partial light beams emerging from the second lens array 34 is converted in the polarization conversion system 40 to third partial light beams that number twice as many as the second partial light beams. Since the number of partial light beams is doubled in the passage through the polarization conversion system 40, when the external shape of the first small lenses 32a of the first lens array 32 is rectangular, and when the reduction ratio (L2/L1) of the power variation optical relay system 30 is smaller than ½, it is desirable that the longer side of the rectangular shape of the first small lenses 32a be in the same direction on as the direction of polarized light separation in the polarization conversion system 40 so as to decrease the size of the total optical system.

The superposition optical system 50 (FIG. 1) includes a third lens array 52, a fourth lens array 54 and a superposition lens 56. In the third lens array 52, third small lenses 52a that are virtually the same as the second small lenses 34a are arrayed on the optical path of the third partial light beams exiting from the polarization conversion system 40. That is, the third lens array 52 is disposed so that the third small lenses 52a are aligned with the second small lenses with respect to the y direction and with the λ/2 retardation film 46a and the transparent layer 46b of the selective retardation plate 46 with respect to the x direction. The fourth lens array 54 has substantially the same configuration as the third lens array 52. When viewed from the z direction, the external shape of the third small lenses 52a corresponds substantially to the shape of the actual illumination area of illumination region 80. For example, if it is assumed that a liquid crystal panel is used as the illumination region, and that the aspect ratio of the image formation area is 4:3, the aspect ratio of the third small lenses 52a will also be set at 4:3.

The third small lenses 52a converges the plurality of third partial light beams emerging from the polarization conversion system 40 in the vicinity of the fourth small lenses 54a of the fourth lens array 54. The fourth lens array 54 is arranged so that the axis of each partial light beam exiting therefrom that falls incident on the superposition lens 56 is perpendicular to the incident flat surface of the superposition lens 56. The superposition lens 56 superposes the plurality of incident partial light beams on the illumination region 80.

In summary, the illumination system 100 is constructed so that the power variation optical relay system 30 is used to divide the beam of parallel light from the light source 20 into a plurality of first partial light beams and to adjust the width of each of the first partial light beams to a width that enables the light beam to pass through the light shield plate 42, meaning a width that is less than the width of the transparent portion 42b in the x direction. Each of the second partial light beams emitted by the power variation optical relay system 30 is converted by the polarization conversion system 40 to linearly polarized light in which the polarized components have the same polarization direction. In this case, the light shield plate 42 is provided on the incident side of the polarization beam splitter array 44, so that only the second partial light beams fall incident on the polarization splitting film 44b. This means that virtually no light falls incident on the polarization splitting film 44b via the reflecting film 44c, and that linearly polarized light emitted from the polarization conversion system 40 is limited to substantially one type. The third partial light beams emerging from the polarization conversion system 40 are converged in the vicinity of the fourth lens array 54 by the third lens array 52. Through the converging action of the fourth lens array 54, each of the partial light beams thus converged exiting therefrom falls incident on the superposition lens 56 with the beam axis perpendicular to the incident surface of the superposition lens 56. Consequently, the partial light beams emerging from the superposition lens 56 are superposed on more or less the same position on the illumination region 80. The result is that the illumination region 80 is uniformly illuminated by substantially one type of linearly polarized light.

As described in the foregoing, in accordance with the illumination system 100 of the first embodiment the power variation optical relay system 30 divides the beam of parallel light from the light source 20 into a plurality of first partial light beams, and also separates the beams and reduce the size of each beam so that substantially the entire beam falls incident on the polarization splitting film 44b of the polarization beam splitter array 44 comprising the polarization conversion system 40. Thus, a polarized light illumination system having a high efficiency of polarization conversion can be achieved with the type of high-output light source lamp described with reference to the prior art.

In the illumination system 100 in FIG. 1, the second lens array 34, polarization conversion system 40 and third lens array 52 are separated to facilitate understanding of the functions of the power variation optical relay system 30, polarization conversion system 40 and superposition optical system 50. However, by using an optical adhesive the second lens array 34, the polarization conversion system 40, and the third lens array 52, albeit the direction the third lens array 52 faces is reversed, can be bonded together to form a single optical element. Alternately, an assembly jig could be used to combine the elements as one unit. Integrating the second lens array 34, polarization conversion system 40 and third lens array 52 would reduce light loss arising in the interfaces between the elements, thereby raising the light utilization efficiency.

In the foregoing explanation, the first to fourth lens arrays 32, 34, 52 and 54 as well as the superposition lens 56 are all plano-convex lenses. However, other lenses may be used, such as biconvex lenses. Moreover, in cases where plano-convex lenses are used, there is no restriction on which is the convex side. That is, the convex side may be on the light source side or on the illumination region side. However, taking into consideration the optical characteristics of the lenses, with reference to reducing spherical and chromatic aberration, it is preferable that in the case of the first lens array 32 and third lens array 52, the convex face be on the light source side. From the standpoint, aspherical lenses may be used instead.

With respect to the length of the optical path between the second lens array 34 and the third lens array 52, the optical path that goes via the reflecting film 44c is longer than the optical path that does not go via the reflecting film 44c by an amount corresponding to the width of the polarization splitting film 44b in the x direction. This can result in a difference in the incident efficiency (brightness) at the third lens array 52 between the beams that reach the third lens array 52 with and without going via the reflecting film 44c However, since the light beams that pass through the polarization conversion system 40 are rendered substantially parallel by the second lens array 34, the difference in incident efficiency is very small. Also, since the light beams emerging from the third lens array 52 are ultimately superposed at one location on the illumination region 80, in practice any difference in incident efficiency at the third lens array 52 does not present a practical problem, and this holds true for the other embodiments and variations described herein, with the exception of the illumination system 100F described with reference to the fifth embodiment.

FIGS. 5(A) and 5(B) illustrate variants of the relay lens array 36. FIGS. 5(A) and 5(B) do not show the polarization conversion system 40 and superposition optical system 50 for convenience of illustration. As described above, the first small lenses 32a of the first lens array 32 condense the light beams onto the relay lenses 36a of the relay lens array 36. Consequently, each of the relay lenses 36a needs to be of a size capable of accommodating the light beam converged by each of the first small lenses 32a. The relay lens array 36A shown in FIG. 5(A) has a plurality of relay lenses 36Aa each of which is just the right size to accommodate the light beams converged by the first small lenses 32a. Similarly, the relay lens array 36B shown in FIG. 5(B) also has a plurality of relay lenses 36Ba each of which is just the right size to accommodate the light beams converged by the first small lenses 32a, and these relay lenses 36Ba are connected by flat plate portions 36Bb. In the arrangement of FIG. 5(B), the lens array can be formed as one element, making fabrication easier than in the case of FIG. 5(A). Moreover, as shown in FIGS. 5(A) and 5(B), the second lens array 34A, corresponding to the second lens array 34 of FIG. 1, has the second small lenses 34Aa arranged in a matrix with no spaces between the lenses, and it is easy to make the second lens array by means of integral moulding.

Figure 6B:
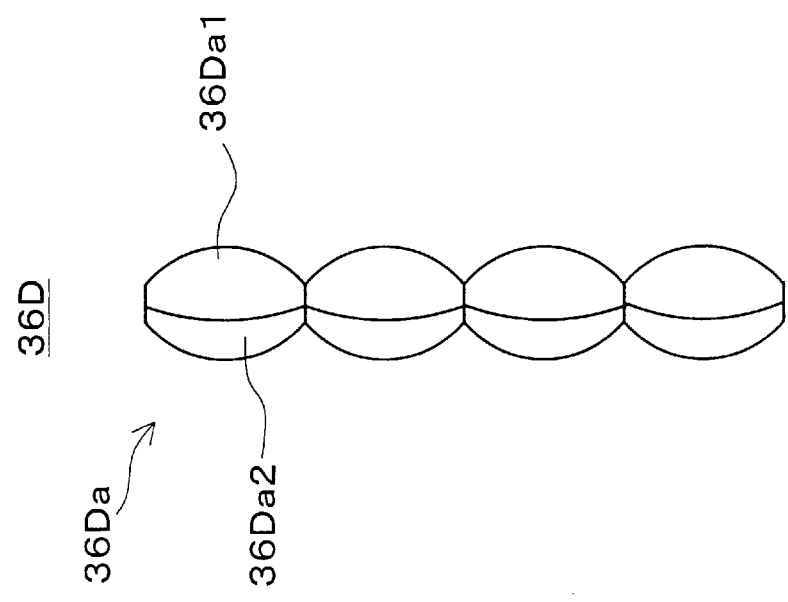
FIGS. 6(A) and 6(B) show other variations of the relay lens array 36.
Figure 6A:
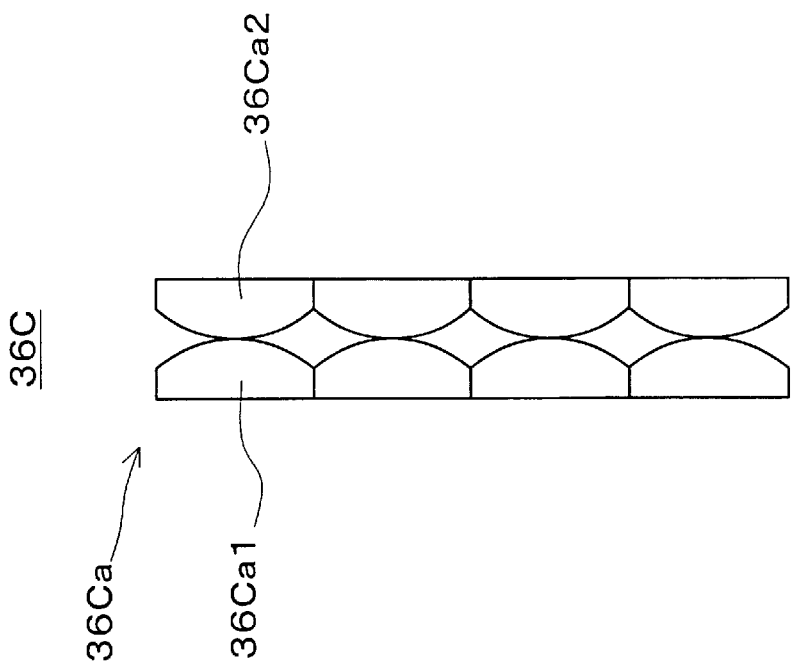

FIGS. 6(A) and 6(B) illustrate other variants of the relay lens array 36. FIGS. 6(A) and (B) show relay lens arrays 36C and 36D comprised of composite relay lenses each formed by joining two lenses together. In FIG. 6(A), the relay lens array 36C is formed of a plurality of composite relay lenses 36Ca. Each composite relay lens 36Ca consists of two planoconvex lenses 36Ca1 and 36Ca2 joined together with the convex sides facing each other. In FIG. 6(B), the relay lens array 36D is formed of a plurality of composite relay lenses 36Da, each consisting of a biconvex lens 36Da1 and a concavo-convex lens 36Da2 joined together with the concave side of the concavo-convex lens 36Da2 contacting the corresponding convex side of the biconvex lens 36Da1.

From the standpoint of guiding the light emerging from the first small lenses 32a to the second small lenses 34a, it is desirable to use lenses having a short focal distance, or a high refractive power, as the relay lenses 36a of the relay lens array 36. In the case of a single short-focal-distance lens, spherical and chromatic aberration has a major effect, which can make it impossible for the plurality of partial light beams formed by the first lens array 32 to be efficiently guided to the second lens array 34, particularly when the light beam emitted by the light source 20 has poor parallelism. Using at least two lenses to constitute the relay lens makes it possible to correct spherical and chromatic aberration. Specifically, using relay lens arrays constituted by composite relay lenses, as in FIGS. 6(A) and 6(B), enables the partial light beams formed by the first lens array 32 to be efficiently guided to the second lens array 34.

Figure 7A:
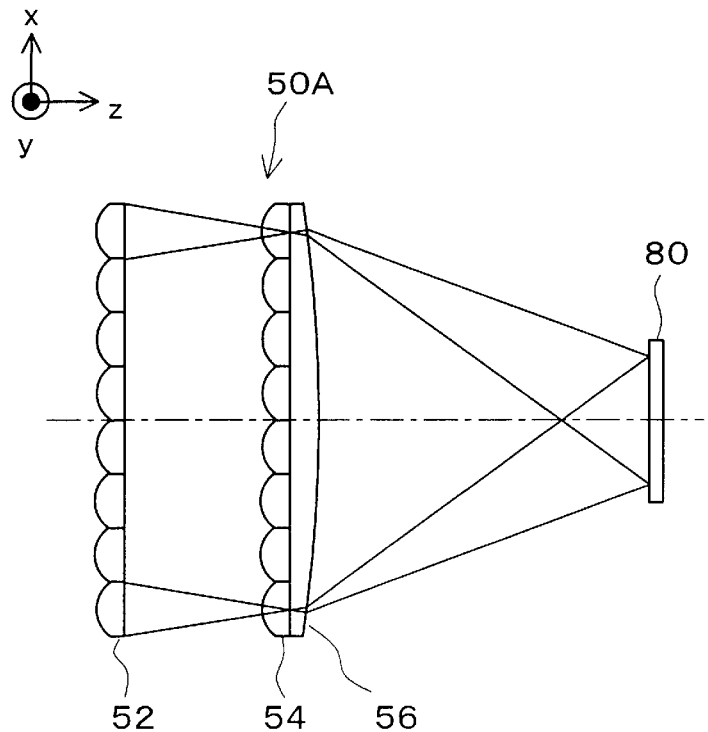
FIGS. 7(A) and 7(B) show variations of the superposition optical system 50.
Figure 7B:
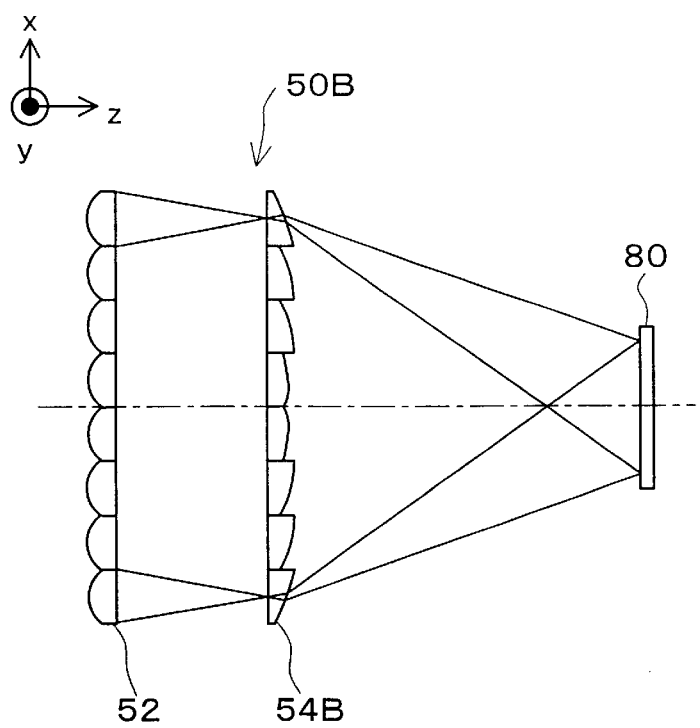

FIGS. 7(A) and 7(B) illustrate variants of the superposition optical system 50. FIGS. 7(A) and 7(B) do not show the light source 20, power variation optical relay system 30 and polarization conversion system 40 for convenience of illustration. In the superposition optical system 50 shown in FIG. 1, there is a space between the fourth lens array 54 and the superposition lens 56. However, these elements may be optically integrated. Thus, optical adhesive can be used to join together the fourth lens array 54 and superposition lens 56 that have been formed as independent optical elements, as shown in FIG. 7(A), or a single optical element may be formed having the functions of both those elements. For example, the fourth lens array 54 and superposition lens 56 may be formed by integral moulding as a single superposition lens array (eccentric lens array) 54B, shown in FIG. 7(B), that possesses the functions of both the fourth lens array 54 and the superposition lens 56. Thus optically integrating the fourth lens array 54 and the superposition lens 56 reduces light loss arising in the interfaces between the elements, thereby further raising the light utilization efficiency. The above embodiment has been described with reference to the use of an optical superposition system that has the third lens array 52, fourth lens array 54 and superposition lens 56. However, the invention is not limited thereto. For example, any optical system configuration can be used that can efficiently transmit light from the polarization conversion system 40 to the illumination region 80 and can also reduce non-uniformity in the brightness level in the illumination region 80.

In the above explanation the aspect ratio of the first small lenses 32a is set to be the same as the aspect ratio of the illumination region 80. However, this is not limitative. Instead, the first small lenses 32a may be of any shape that will enable the light to efficiently impinge on the polarization splitting film 44b. However, in order for the illumination region 80 to be illuminated with high efficiency, it is preferable for the third small lenses 52a to be given the same aspect ratio as the illumination region 80. As such, to reduce light loss and improve the light utilization efficiency, it is also preferable to give the first small lenses 32a the same aspect ratio as the illumination region 80. Based on the same type of consideration, while there are no constraints on the shapes of the small lenses 34a and 54a of the second lens array 34 and fourth lens array 54, it is desirable to use small lenses having a rectangular shape in order to facilitate their arrangement into a matrix.

Furthermore, the explanation of the illumination system 100 was given with reference to the use of the usual concentric lenses for the first small lenses 32a, second small lenses 34a and relay lenses 36a. However, all or part of those lenses may be cylindrical lenses that have a refractive power in the direction along which the polarization splitting film 44b and reflecting film 44c are arrayed, that is, the x direction in the above embodiment. Alternatively, those lenses may be toric lenses that have different refractive powers along the x and y axes. Also, using eccentric lenses for the first lens array 32 and the second lens array 34 would, for example, enable the dimensions of the first lens array 32 in the xy plane to be made larger than those of the second lens array 34, permitting the light emitted by the light source 20 to be guided efficiently to the polarization conversion system 40.

Each of the variations described above can also be applied to the other embodiments described in the following.

B. Second Embodiment

Figure 8:
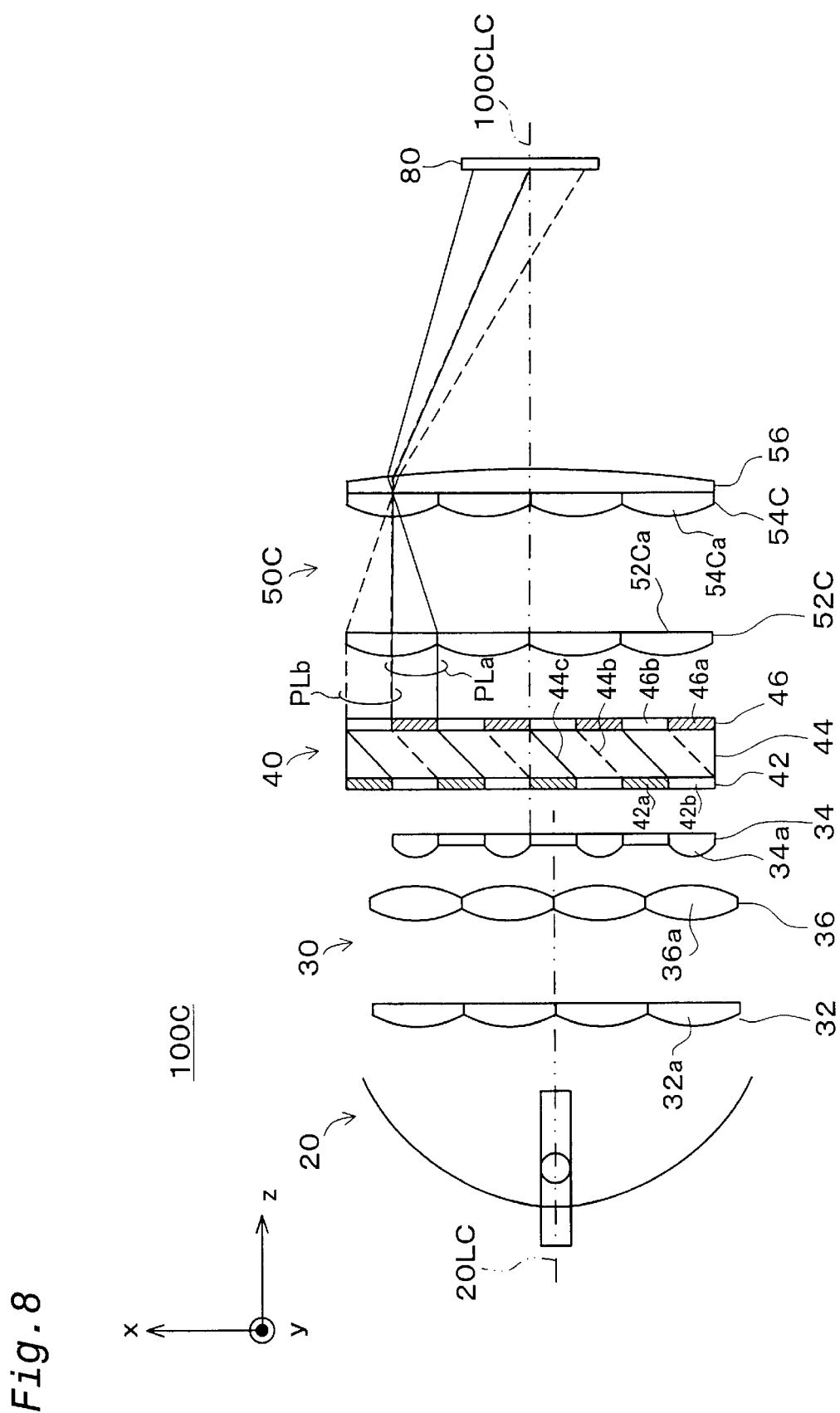
FIG. 8 is a plan view of the general configuration of main parts of an illumination system as a second embodiment of the invention.

FIG. 8 is a plan view of the general configuration of main parts of an illumination system as a second embodiment of the invention. In this illumination system 100C, a superposition optical system 50C is used instead of the superposition optical system 50 of the illumination system 100 shown in FIG. 1. The superposition optical system 50C includes a third lens array 52C, fourth lens array 54C and superposition lens 56. In the third lens array 52C, one small lens 52Ca is substituted for every two of the third small lenses 52a arrayed in the x direction of the third lens array 52 (FIG. 1). Two partial light beams, one exiting from the polarization splitting film 44b and the other from the reflecting film 44c, fall on each of the third small lenses 52Ca. The fourth lens array 54C has a plurality of fourth small lenses 54Ca positioned to correspond to the third small lenses 52Ca of the third lens array 52C.

The two partial light beams PLa and PLb exiting from the λ/2 retardation film 46a and transparent layer 46b of the selective retardation plate 46 constituting the polarization conversion system 40 are converged in the vicinity of the fourth lens array 54C by the third small lenses 52Ca. Via the superposition lens 56, the partial light beam PLa from the λ/2 retardation film 46a illuminates the part of the illumination region 80 on the +x side of the system optical axis 100CLC, while the partial light beam PLb illuminates the part of the illumination region 80 on the −x side of the optical axis 100CLC. In the same way, the illumination region 80 is illuminated by the other partial light beams coming from the other λ/2 retardation films 46a and transparent layers 46b. So, the plurality of partial light beams emerging from the λ/2 retardation films 46a are superposed on the illumination region 80 on the +x side with respect to the system optical axis 100CLC and the partial light beams emerging from the transparent layers 46b are superposed on the illumination region 80 on the −x side relative to the system optical axis 100CLC.

Thus, as in the first embodiment, the illumination system 100C of the second embodiment enables the illumination region 80 to be uniformly illuminated with virtually one type of linearly polarized light. Also, an illumination system having a high polarized light conversion efficiency can be attained. Moreover, a polarized light illumination system can be achieved with the type of high-output light source lamp described with reference to the prior art.

As described, in accordance with the arrangement of this second embodiment the partial light beams emerging from the λ/2 retardation films 46a and the transparent layers 46b are used to separately illuminate different sides of the illumination region 80, one being the +x side and the other the −x side, relative to the system optical axis 100CLC. This can give rise to brightness variations and cause brightness demarcation lines on the illumination region 80 when there is a major difference between the effective illumination intensities of the partial light beams emerging from the λ/2 retardation films 46a and those emerging from the transparent layers 46b. However, such an intensity variation can be decreased to a very low level by optimizing the optical characteristics of the polarization splitting film 44b and λ/2 retardation film 46a, virtually eliminating any demarcation line. Moreover, even though variations in the characteristics of the small lenses 52Ca and 54Ca may result in slight positional deviation of the partial light beams on the illumination region 80, variations in brightness and brightness demarcation lines can be prevented. In the illumination system 100 of the first embodiment, the partial light beams emitted by the polarization conversion system 40 are used to illuminate the whole area of the illumination region 80, so that there are no such brightness variations or demarcation lines on the illumination region 80. In terms of uniformity of illumination, therefore, the first embodiment is preferable to the second embodiment. The second embodiment is advantageous in that fewer small lenses are used to form the third lens array 52C and the fourth lens array 54C, which, by reducing light loss in the junctions between the small lenses, makes the illumination light efficiency much higher.

There is no strict relationship between the number of partial light beams emerging from the polarization splitting film 44b and reflecting film 44c portions of the polarization conversion system 40 and the number of small lenses 52a and 54a of the third and fourth lens arrays 52 and 54. Therefore, as described with reference to the second embodiment, an arrangement can be used in which one small lens on the third lens array and another on the fourth lens array can be used to transmit a pair of partial light beams from an adjoining pair of polarization splitting film 44b and reflecting film 44c. Conversely, also, an arrangement can be used in which there are two or more small lenses for each partial light beam emerging from a polarization splitting film 44b or reflecting film 44c. Use of the latter arrangement would make it possible to further reduce non-uniformity of brightness on the illumination region 80.

C. Third Embodiment

Figure 9:
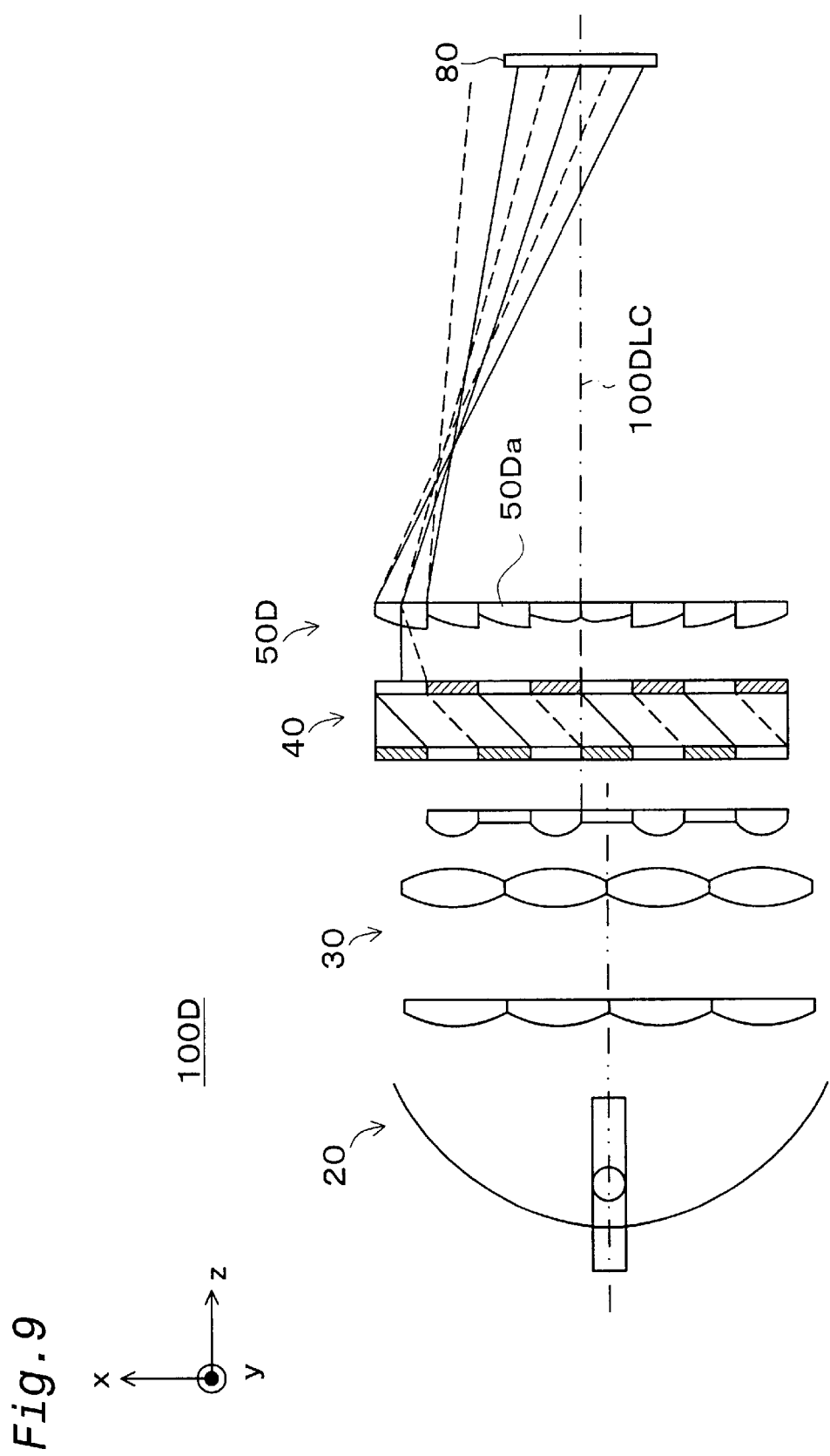
FIG. 9 is a plan view of the general configuration of main parts of an illumination system as a third embodiment of the invention.

The first and second embodiments relates to an illumination system having a superposition optical system that utilizes an integrator optical system, but it is not essential to use an integrator optical system. FIG. 9 is a plan view of the general configuration of main parts of an illumination system as a third embodiment of the invention. In this illumination system 100D, a superposition lens array 50D is used instead of the superposition optical system 50 of the illumination system 100 shown in FIG. 1. The superposition lens array 50D includes a plurality of small lenses 50Da disposed on the optical paths of the plurality of partial light beams emerging from the polarization conversion system 40. The small lenses 50Da are eccentric lenses in which the optical axis is displaced, depending on the distance from the system optical axis 100DLC, so that the partial light beams that emerge from the small lenses 50Da are superposed on the illumination region 80.

Thus, as in the first two embodiments, the illumination system 100D of the third embodiment enables the illumination region 80 to be uniformly illuminated with virtually one type of linearly polarized light. Also, an illumination system having a high polarized light conversion efficiency can be attained. Moreover, a polarized light illumination system can be achieved with the type of high-output light source lamp described with reference to the prior art.

Because the third embodiment has fewer constituent elements than the first and second embodiments, the apparatus can be made smaller. However, as described below, the first two embodiments offer a better light utilization efficiency than the third embodiment.

If the light incident on the superposition lens array 50D has good parallelism, the light beams that emerge from the superposition lens array 50D are substantially superposed on the illumination region 80. In practice, however, light emitted from the light source 20 is not perfectly parallel. In particular, the degradation of the parallelism of light emitted by the power variation optical relay system 30 is inversely proportional to the reduction ratio described above (L2/L1). Because partial light beams incident on the superposition lens array 50D at a given angle to the system optical axis 100DLC illuminate the region at a slightly different position than partial light beams that are incident on the superposition lens array 50D substantially parallel to the system optical axis 100DLC, it is difficult to superpose all of the partial light beams emerging from the superposition lens array 50D at the same position on the illumination region 80. Therefore, in order to obtain uniform illumination of the illumination region 80, it is desirable to set each of the partial light beams emerging from the small lenses 50Da to illuminate a slightly larger area than the illumination region 80. The result is that light utilization efficiency at the illumination region 80 in the third embodiment becomes lower than that in the first embodiment. When a superposition optical system 50 employs an integrator optical system, as in the illumination system 100 of the first embodiment, each of the plurality of partial light beams emitted by the superposition optical system 50 are superposed at substantially the same position on the illumination region 80.

Therefore, the first and second embodiments may provide a higher light utilization efficiency than the third embodiment.

D. Fourth Embodiment

Figure 10A:
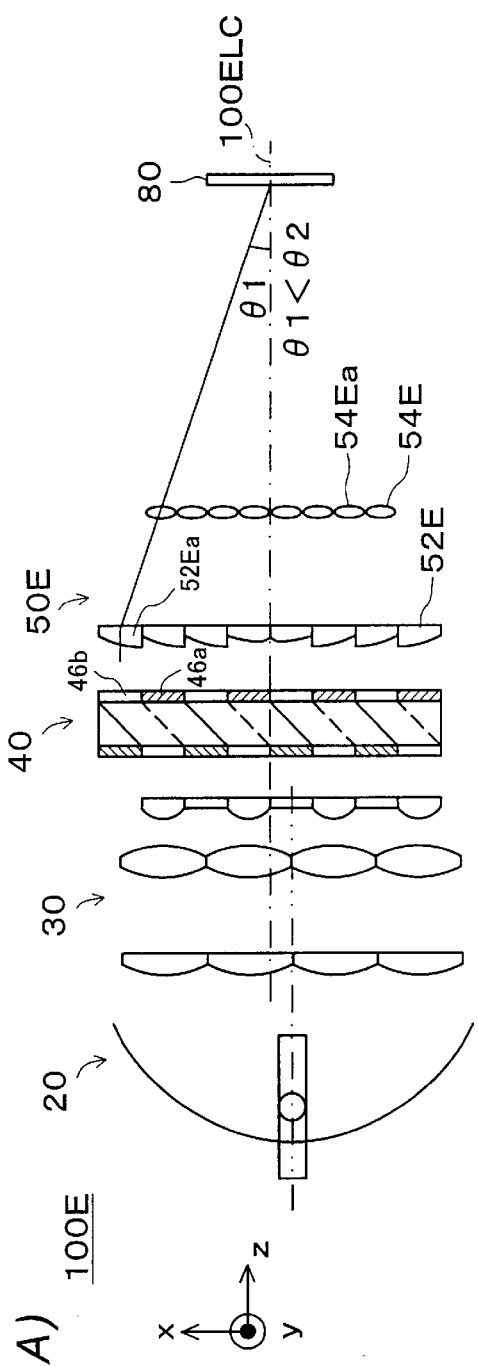
FIGS. 10(A) and 10(B) show a comparison between an illumination system of a fourth embodiment, and the illumination system of the first embodiment.
Figure 10B:
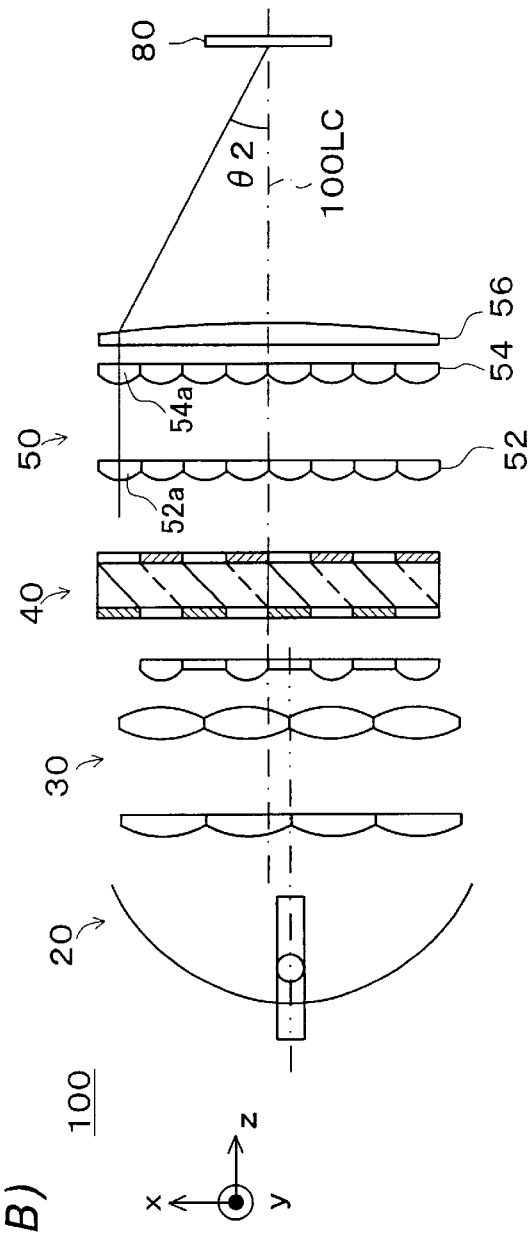

FIGS. 10(A) and 10(B) show a comparison between an illumination system of a fourth embodiment, and the illumination system of the first embodiment. FIG. 10(A) is a plan view of the general configuration of main parts of the illumination system of the fourth embodiment, while FIG. 10(B) shows the illumination system 100 of the first embodiment. This illumination system 100E has a superposition optical system 50E in place of the superposition optical system 50 of the illumination system 100. The superposition optical system 50E includes a third lens array 52E and a fourth lens array 54E. The third lens array 52E has the functions of the third lens array 52 and superposition lens 56 of the illumination system 100. The plurality of small lenses 52Ea constituting the third lens array 52E are eccentric lenses in which the optical axis is displaced, depending on the distance from the system optical axis 100ELC, so that the partial light beams emerging from the small lenses 50Ea are superposed on the illumination region 80. The fourth lens array 54E includes a plurality of small lenses 54Ea disposed on the optical paths of the plurality of partial light beams exiting from the third lens array 52E. By means of the converging powers of the plurality third lens array 52F constitute a power variation optical relay system 30F. Also, the third lens array 52F, the fourth lens array 54 and the superposition lens 56 constitute a superposition optical system 50F. Also, the fourth lens array 54 and superposition lens 56 can be regarded as constituting the superposition optical system 50F.

The first lens array 32 divides the beam of parallel light from the light source 20 into a plurality of partial light beams and converges the light beams within the relay lens array 36. The plurality of partial light beams emerging from the relay lens array 36 pass through the polarization conversion system 40 and fall on the third lens array 52F. The plurality of partial light beams falling on the third lens array 52F are superposed on the illumination region 80 by the superposition optical system 50F.

The plurality of partial light beams emerging from the relay lens array 36 fall on the third lens array 52F. Since the polarization conversion system 40 is provided between the relay lens array 36 and the third lens array 52F, the width of each partial beam incident on the polarization conversion system 40 is less than the width of each partial light beam incident on the third lens array 52F, and less than the width of the polarization splitting film 44b in the x direction, that is, the x-direction width of the transparent portion 42b of the light shield plate 42.

Figure 12:
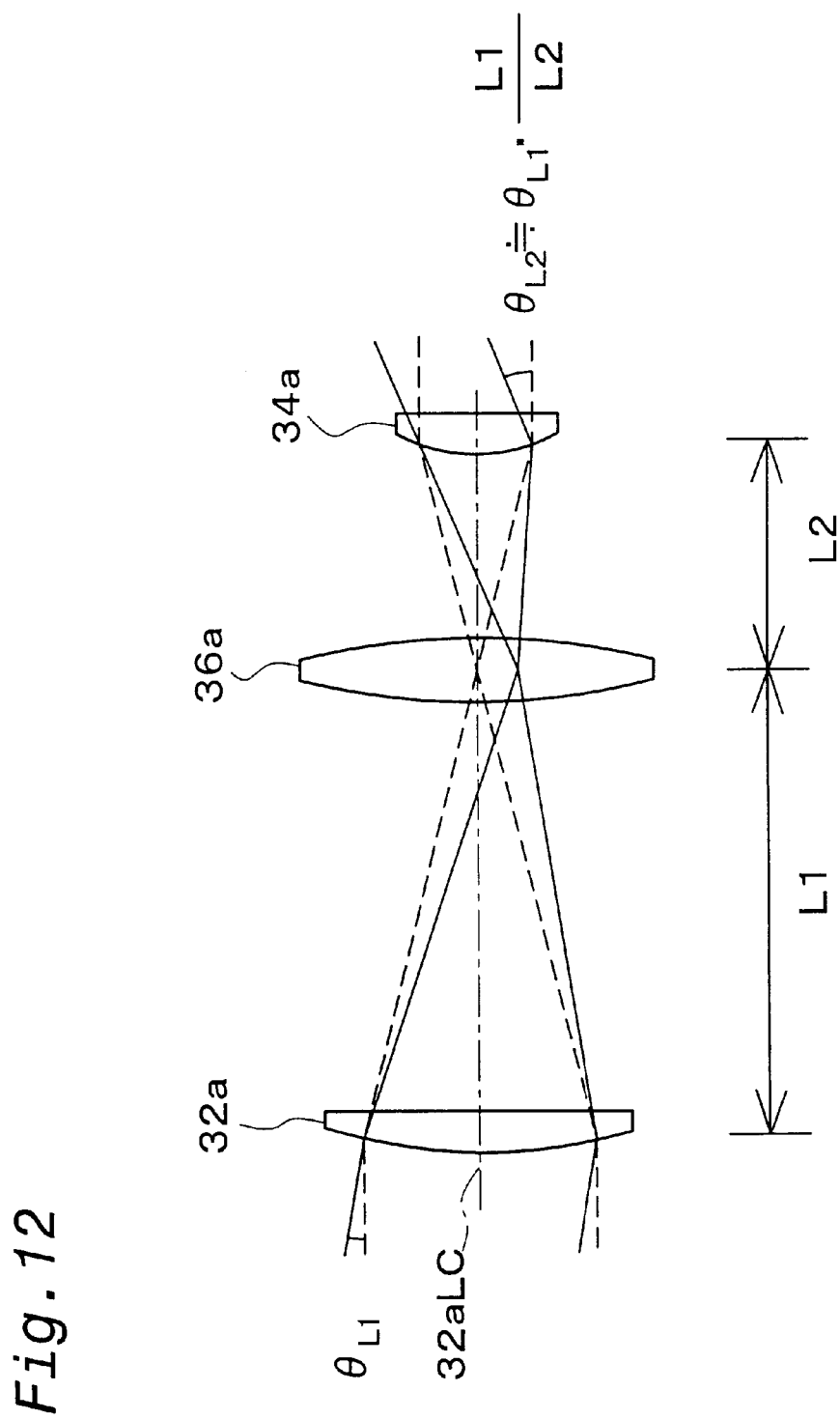
FIG. 12 is an explanatory diagram relating to the parallelism of the light beams incident on the power variation optical relay system 30.

FIG. 12 is an illustrative diagram relating to the parallelism of the light beams incident on the power variation optical relay system 30. In the illumination system 100 of the first embodiment, partial light beams reduced by a prescribed reduction ratio (L2/L1) fall incident on the second small lenses 34a. Because the light emitted by the light source 20 is not perfectly parallel, the partial light beams fall incident on the first small lenses 32a at various of small lenses 54Ea, even those light beams that are emitted by the light source 20 at an inclined angle relative to the system optical axis 100ELC are superposed at substantially the same position on the illumination region 80. Here, the angle of incidence of the axis of the partial light beam emerging from the outermost small lens 52Ea is assumed to be θ1 on the illumination region 80, and the angle of incidence of the axis of the partial light beam emerging from the outermost small lens 52a is assumed to be θ2 on the illumination region 80.

The third lens array 52E functions as a superposition lens, so that if the distance from the third lens array 52E to the illumination region 80 is the same as that from the third lens array 52 of the illumination system 100 to the illumination region 80, angle of incidence θ1 will be smaller than θ2.

The characteristics of an optical system such as a liquid crystal panel or lenses on which light emitted from the illumination system falls incident are dependent on the angle of light incidence. In general, a smaller angle of incidence means a higher light utilization efficiency. Therefore, compared to the illumination system 100 of the first embodiment, the illumination system 100E of the fourth embodiment is advantageous in that it produces a higher light utilization efficiency in the illumination region.

E. Fifth Embodiment

Figure 11:
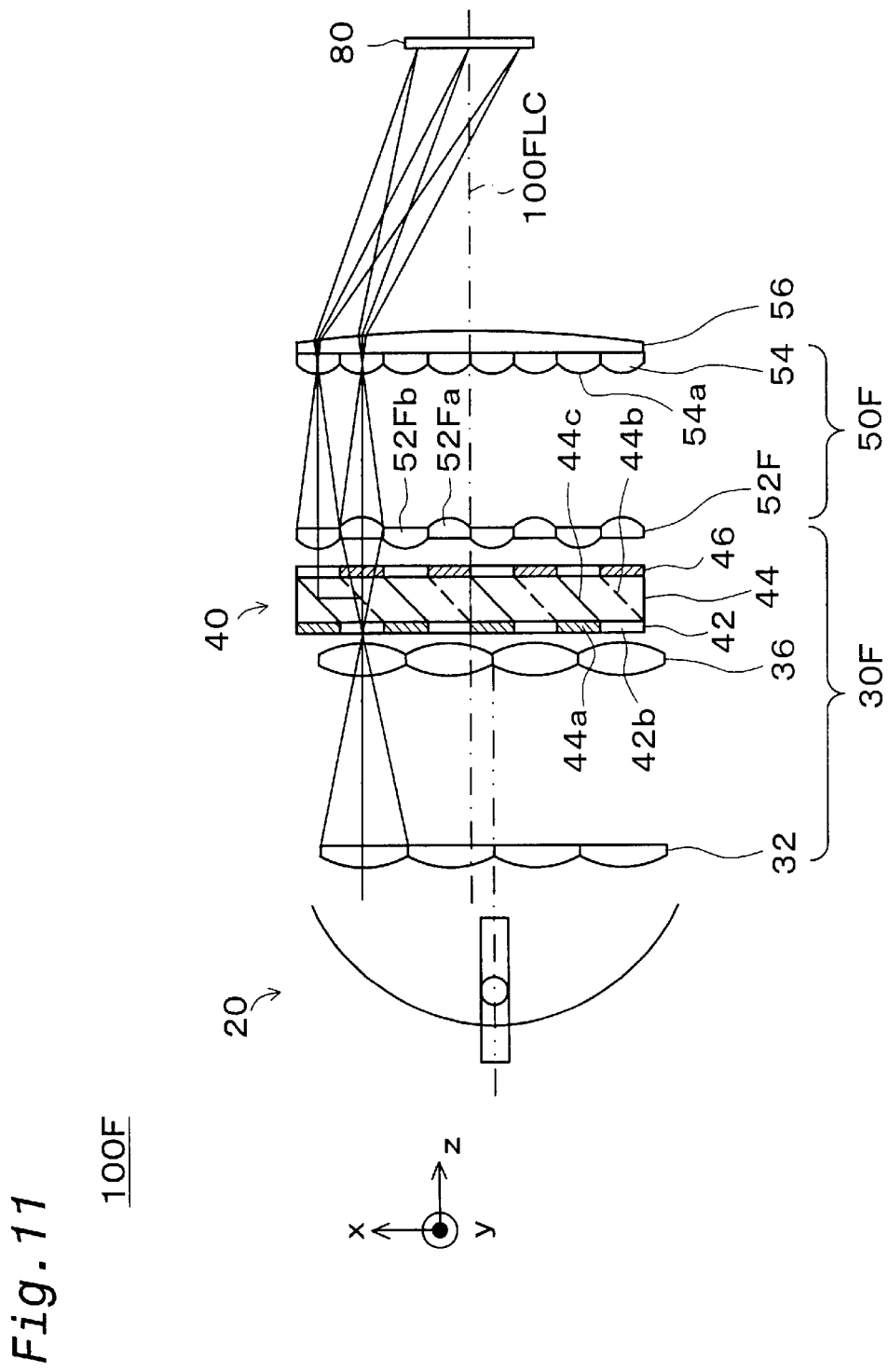
FIG. 11 is a plan view of the general configuration of main parts of an illumination system as a fifth embodiment of the invention.

FIG. 11 is a plan view of the general configuration of main parts of an illumination system as a fifth embodiment of the invention. In this illumination system 100F, the second lens array 34 of the illumination system 100 of the first embodiment is omitted and instead of the third lens array 52 a third lens array 52F is used having the functions of the second lens array 34 and the third lens array 52. The first lens array 32, relay lens array 36 and angles to the optical axis 32aLC. A partial light beam that falls incident at an angle θL1 to the optical axis 32aLC is guided to the second small lenses 34a in the same way as the partial light beams that are parallel to the optical axis 32aLC, but exit from the second small lenses 34a at an angle θL2 ($\approx$θL1×L1/L2) that is larger than θL1. As a result, a light beam emerging from the second small lenses 34a continues to diverge as the distance from the second small lenses 34a increases. Therefore, each of the partial light beams emerging from the second lens array may become too large for the corresponding third small lenses 52a of the third lens array, resulting in a decrease in the light utilization efficiency.

Since in the illumination system 100F the third lens array 52F includes the functions of the second lens array, compared to the illumination system 100 of the first embodiment, it has the advantage of being able to improve the light utilization efficiency of light incident on the polarization beam splitter array 44 and light incident on the third lens array 52F. The second lens array 34 does not have to be omitted, but can instead be included in the vicinity of the third lens array 52. However, from the standpoint of light utilization efficiency, it is advantageous to omit the second lens array 34 and use the third lens array 52F. It is also advantageous in terms of simplifying the structure of the illumination system.

With respect to the length of the optical path between the relay lens array 36 and the third lens array 52F, the optical path that goes via the reflecting film 44c is longer than the optical path that does not go via the reflecting film 44c by an amount corresponding to the width of the polarization splitting film 44b in the x direction (see FIG. 4(B)). In the present arrangement the first lens array 32, relay lens array 36 and third lens array 2F constitute the power variation optical relay system, so that the difference in the length of the optical path does not affect the width of a light beam incident on the third lens array 52F. Specifically, a light beam impinging on the third small lenses 52Fb located after the reflecting film 44c is wider than a light beam impinging on the third small lenses 52Fa located after the polarization splitting film 44b. This difference in width does not affect the incident light efficiency with respect to the third lens array 52F. This being the case, it is desirable to construct the third lens array 52F using third small lenses 52Fa and 52Fb which are slightly modified in terms of the optical characteristics of the lenses (focal distance, for example) or location on the z axis (specifically, locating the third small lenses 52F*b* closer to the polarization conversion system 40 than to the third small lenses 52F*a*). The lens characteristics of the fourth small lenses 54*a* constituting the fourth lens array 54 may be correspondingly modified. Employing a third lens array 52F thus configured makes it possible to eliminate the effect of the above differences in optical path length. Thus, in this example, the third small lenses 52F*a* and 52F*b* that are plano-convex lenses having two types of different optical characteristics are disposed with the convex surfaces oriented in opposite directions.

F. Sixth Embodiment

Figure 13:
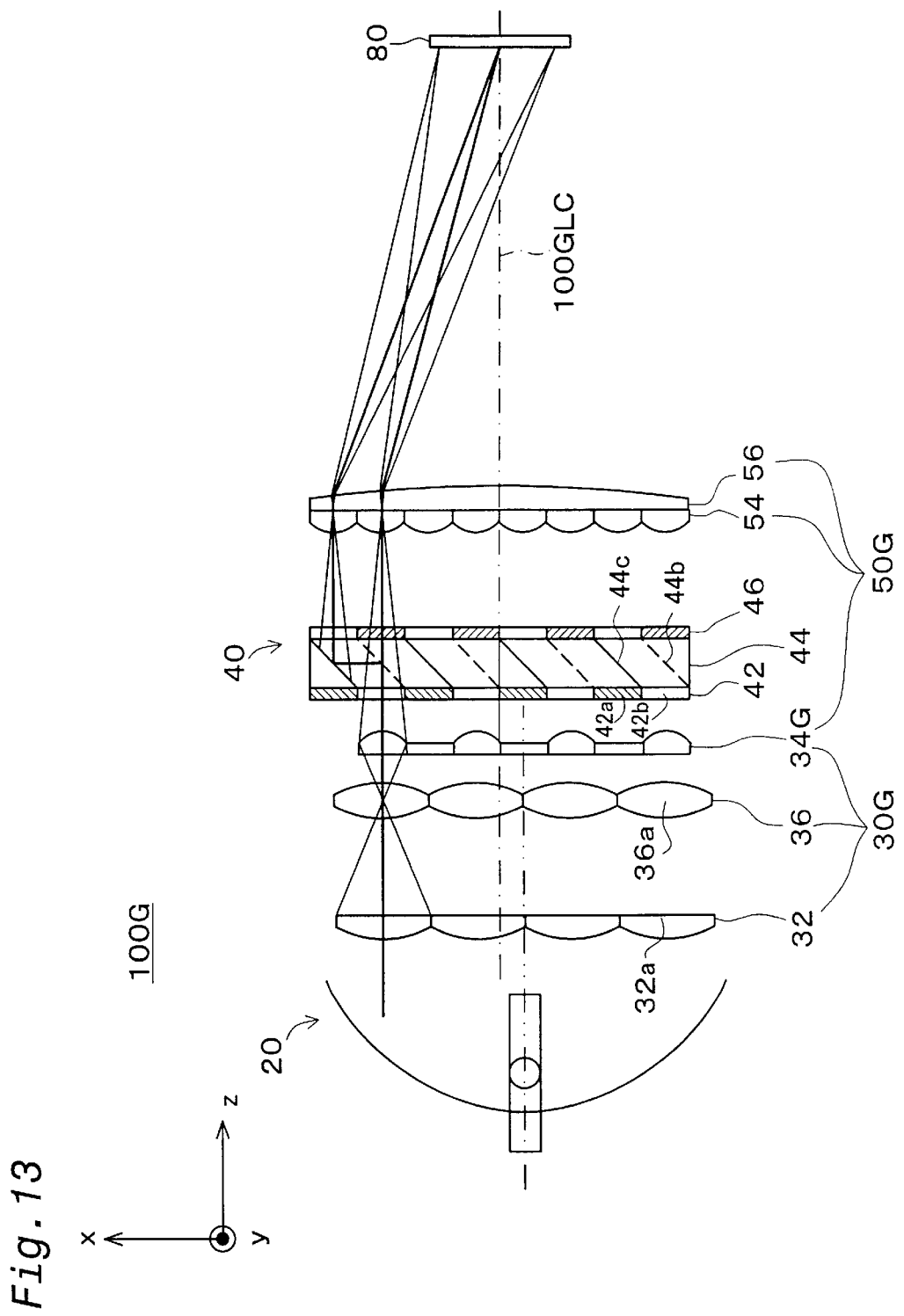
FIG. 13 is a plan view of the general configuration of main parts of an illumination system as a sixth embodiment of the invention.

FIG. 13 is a plan view of the general configuration of main parts of an illumination system as a sixth embodiment of the invention. In this illumination system 100G, the third lens array 52 of the illumination system 100 of the first embodiment is omitted and, instead of the second lens array 34, a second lens array 34G is used having the functions of the second lens array 34 and the third lens array 52. Thus, the first lens array 32, relay lens array 36 and second lens array 34G constitute a power variation optical relay system 30G. Also, the second lens array 34G, fourth lens array 54 and the superposition lens 56 constitute a superposition optical system 50G. The fourth lens array 54 and superposition lens 56 can also be regarded as constituting the superposition optical system 50G.

The first lens array 32 divides the beam of parallel light from the light source 20 into a plurality of partial light beams and converges the light beams within the relay lens array 36. The plurality of diverging partial light beams emerging from the relay lens array 36 fall incident on the second lens array 34G. The plurality of partial light beams falling on the second lens array 34G are again converged in the vicinity of the fourth lens array 54 by the second lens array 34G. The plurality of partial light beams thus converged in the vicinity of the fourth lens array 54 are superposed on the illumination region 80 by the superposition lens 56.

The plurality of partial light beams emerging from the second lens array 34G converge to fall incident on the fourth lens array 54. The polarization conversion system 40 is provided between the second lens array 34G and the fourth lens array 54. The width of each partial beam incident on the polarization conversion system 40 is less than the width of the polarization splitting film 44*b* in the x direction, that is, less than the x-direction width of the transparent portion 42*b* of the light shield plate 42. Compared to the illumination system 100 of the first embodiment, the illumination system 100G of this sixth embodiment has the advantage of being able to improve the light utilization efficiency of light incident on the polarization beam splitter array 44. The third lens array 52 does not have to be omitted, but can instead be included in the vicinity of the second lens array 34. However, from the standpoint of light utilization efficiency, it is advantageous to omit the third lens array 52 and use the second lens array 34G. It is also advantageous in terms of simplifying the structure of the illumination system.

In the second lens array 34G, the number of lenses arrayed in the x direction is less than the number of lenses of the third lens array 52 arrayed in the x direction. The reason for the lower number is that in the x direction the number of partial light beams emitted by the polarization conversion system 40 is twice the number of the incident partial light beams. Because the second lens array 34G having the functions of both the second lens array 34 and the third lens array 52 is disposed on the entry side of the polarization conversion system 40, it can be configured with fewer lenses in the x direction than the third lens array 52. In accordance with this invention, "optically integrated" does not only mean using adhesive to bond together multiple optical elements to form a single optical element possessing the functions of the multiple optical elements, but also includes eliminating optical components that are not necessary.

G. Seventh Embodiment

Figure 14:
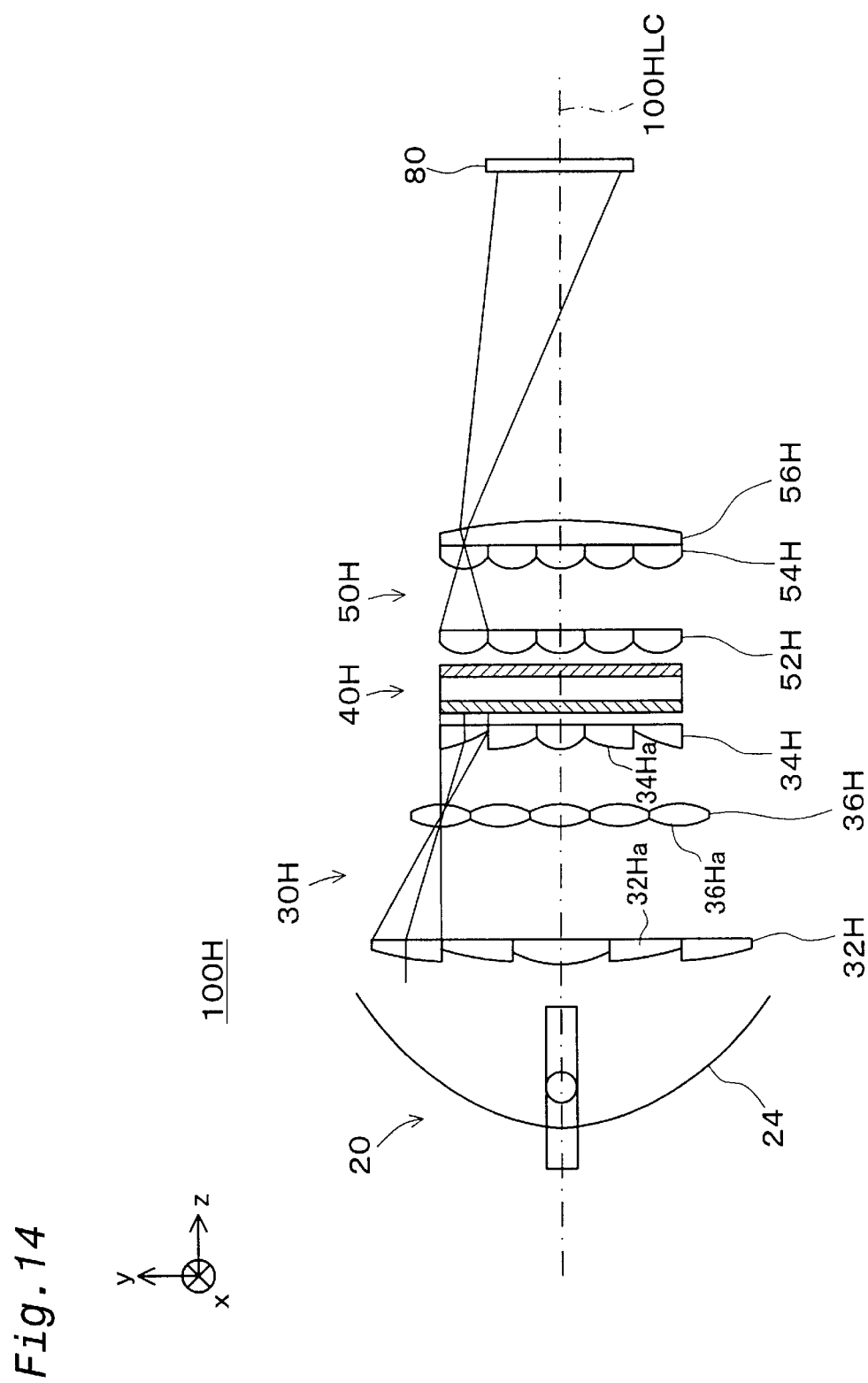
FIG. 14 is a side view of the general configuration of main parts of an illumination system as a seventh embodiment of the invention.

FIG. 14 is a side view of the general configuration of main parts of an illumination system as a seventh embodiment of the invention. In this illumination system 100H, the power variation optical relay system 30 of the first embodiment has been replaced by a power variation optical relay system 30H. Other than the difference in size along the y axis, polarization conversion system 40H and superposition optical system 50H are the same as the polarization conversion system 40 and superposition optical system 50.

The power variation optical relay system 30H includes a first lens array 32H, a relay lens array 36H and a second lens array 34H. The first lens array 2H includes a plurality of first small lenses 32H*a*. The first small lenses 32H*a* are eccentric lenses in which the position of the optical axis is offset in the y direction by an amount that depends on the distance from the system optical axis 100HLC in the y direction. Therefore, a partial light beam emerging from a first small lens 32H*a* offset from the system optical axis 100HLC in the ±y axis direction is deflected in accordance with the offset amount.

The relay lens array 36H includes a plurality of relay lenses 36H*a* disposed on the optical paths of the plurality of partial light beams emerging from the first lens array 32H. Compared to the relay lens array 36 of the illumination system 100 shown in FIG. 1, the relay lens array 36H is smaller along the y axis to each side of the system optical axis 100HLC. The second lens array 34H includes a plurality of second small lenses 34H*a* disposed on the optical paths of the partial light beams emerging from the relay lens array 36H, and is smaller along the y axis to each side of the system optical axis 100HLC than the second lens array 34 of the illumination system 100. The second small lenses 34H*a* are eccentric lenses in which the position of the optical axis is offset in the y direction in the opposite direction (along the y axis) from the optical axis of the corresponding first small lenses 32H*a* by an amount that is related to the distance from the system optical axis 100HLC. As a result, the central axis of each of the partial light beams emerging from the second lens array 34H is substantially parallel to the system optical axis 100HLC.

Figure 15A:
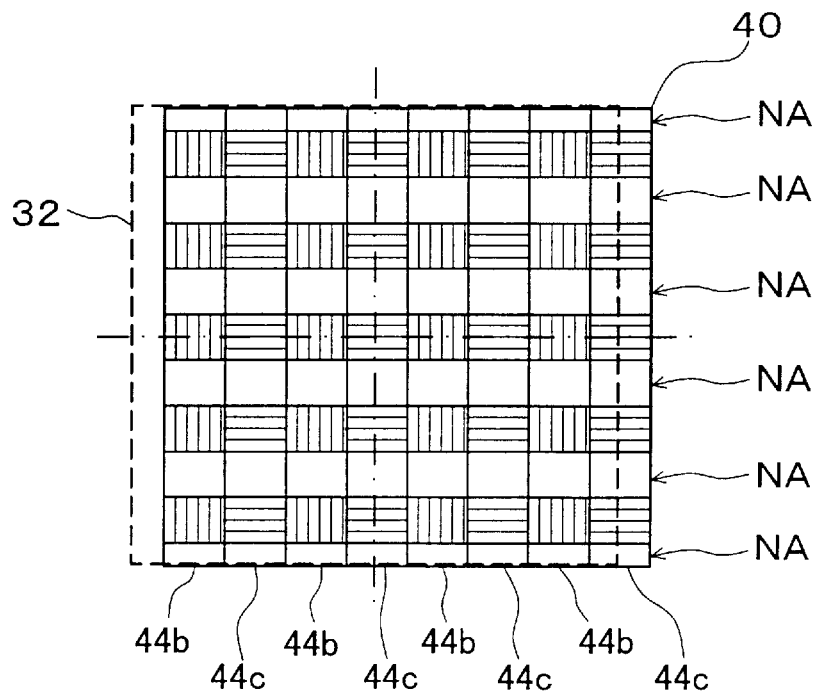
FIGS. 15(A) and 15(B) show a comparison between the shape of the light beams falling on the polarization conversion system 40 in the illumination system 100 of the first embodiment, and the shape of the light beams falling on the polarization conversion system 40H in the illumination system 100H of the seventh embodiment.
Figure 15B:
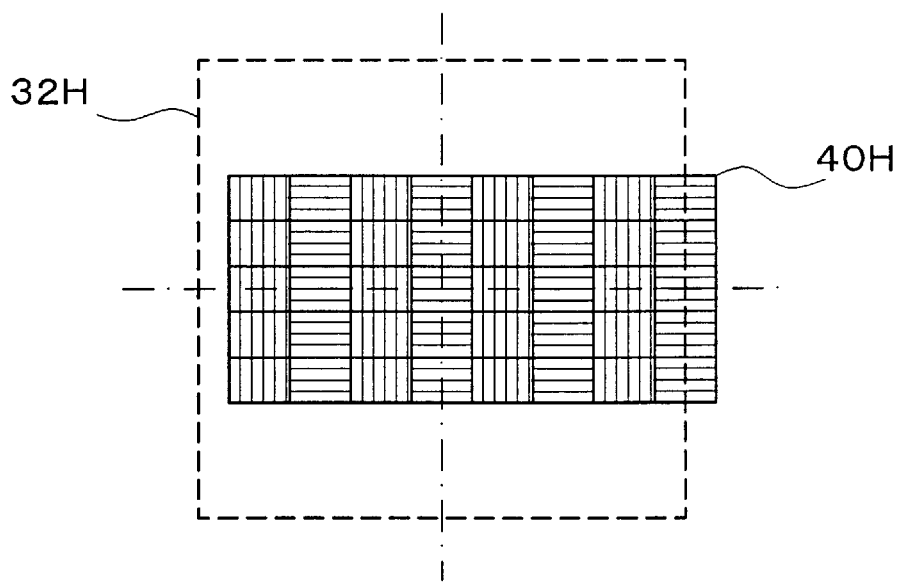

FIGS. 15(A) and 15(B) show a comparison between the shape of the light beams falling on the polarization conversion system 40 of the first embodiment, and the shape of the light beams falling on the polarization conversion system 40H in the illumination system 100H of the seventh embodiment. In each case, the view is taken from the illumination region 80. With reference to FIG. 15(A), a plurality of partial light beams fall incident on the polarization splitting film 44*b* and reflecting film 44*c* of the polarized light beam splitter array constituting the polarization conversion system 40. Each of the partial light beams emerging from the first lens array 32 is contracted by the power variation optical relay system 30 and impinges on the polarization conversion system 40. This gives rise to the areas NA between the partial light beams in the vertical direction where there is no light at all. When the polarization conversion system 40H is used, as shown in FIG. 15(B), the NA areas are eliminated and the vertical size of the polarization conversion system 40 can be decreased.

Thus, in accordance with the illumination system 100H of the seventh embodiment the polarization conversion system 40 of the first embodiment is replaced by a polarization conversion system 40H that is smaller in the vertical direction, enabling the optical system downstream of the polarization conversion system 40H to be made smaller. Moreover, the angle of incidence of light incident on the illumination region 80 in the y direction can be reduced, making it possible to increase the light utilization efficiency on the illumination region, compared to the illumination system 100.

Even if the first lens array 32H is the same as the first lens array 32 of the first embodiment and an elliptical mirror is used for the concave mirror 24 of the light source 20, the same effect can be obtained as that obtained with the illumination system 100H. In particular, since the first lens array 32 is formed of concentric lenses, manufacturing costs and various types of aberration in the first lens array 32 can be more effectively reduced than is the case with the illumination system 100H.

H. Eighth Embodiment

FIG. 16 is a plan view of the general configuration of main parts of an illumination system as an eighth embodiment of the invention. This illumination system 100I includes a power variation optical relay system 30I, a polarization conversion system 40I and a superposition optical system 50I.

When the concave mirror 24 of the light source 20 is a parabolic mirror, the parallelism of the light beam emitted by the light source 20 tends to be poorest around the optical axis (hereinafter also referred to as the center portion) and better toward the periphery. As described above with reference to FIG. 12 in the fifth embodiment, when the beam has poor parallelism, the partial light beams exiting from the power variation optical relay system each tend to exhibit greater divergence. Consequently, the partial light beams falling on the polarization conversion system 40H also tend to be larger in the center portion than at the periphery. Moreover, since the light intensity is higher at the center portion of the light source 20, it is desirable to set the size of the polarization conversion system 40H in the x direction in line with the size of the partial light beams of the center portion. Using the center portion partial light beams as the reference enables the peripheral portion partial light beams to be made smaller, vertically and horizontally, than the center portion partial light beams, thereby also making it possible to reduce the vertical and horizontal size of the peripheral portion of the polarization conversion system 40H.

The polarization conversion system 40I is configured with the portion 40I1 on which the partial light beams that are outermost in the ±x direction fall being smaller than the other portion 40I2. The power variation optical relay system 30I is comprised of two parts 30I1 and 30I2 having different lens characteristics, with part 30I1 producing light beams of a size corresponding to the polarization conversion system portion 40I1 and part 30I2 producing light beams of a size corresponding to the polarization conversion system portion 40I2. The third lens array 52I and fourth lens array 54I are also configured with parts 52I1 and 54I1 corresponding to the size of the polarization conversion system portion 40I1 and parts 52I2 and 54I2 corresponding to the size of the polarization conversion system portion 40I2.

The illumination system 100I is positioned on the downstream side of the polarization conversion system 40I, enabling it to be made smaller. Also, the angle of incidence of light on the illumination region 80 can be decreased, so that when optical systems or optical elements in which the optical characteristics are dependent on the angle of incidence are to be used downstream of the illumination system, the light utilization efficiency of such systems and elements can be increased compared to the illumination system 100 of the first embodiment.

J. Ninth Embodiment

Figure 17:
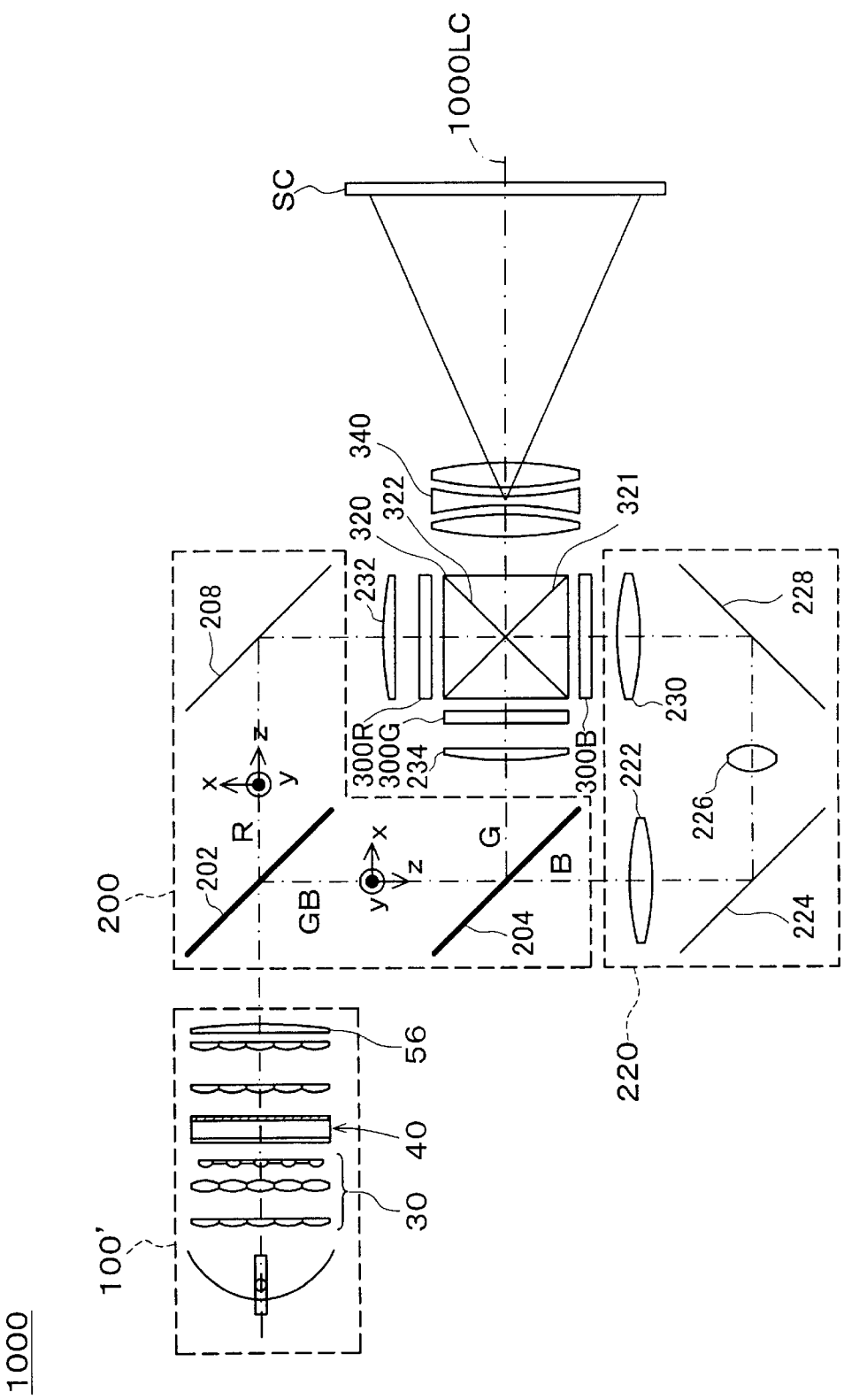
FIG. 17 is a plan view of the general configuration of main parts of a projector that uses the illumination system of the invention.

FIG. 17 is a plan view of the general configuration of main parts of a projector that uses the illumination system of the invention. This projector 1000 includes an illumination system 100', a color separator 200, a light guide system 220, three liquid crystal light valves (liquid crystal panels) 300R, 300G, 300B, a cross dichroic prism 320 and a projection optical system 340. In the projector 1000, light emitted by the illumination system 100' is separated into red (R), blue (B) and green (G) light by the color separator 200. The light of each color passes through the corresponding liquid crystal light valves 300R, 300G and 300B and is modulated in accordance with the image information. The modulated color lights are then combined by the cross dichroic prism 320, and the color image is displayed on a screen SC by the projection optical system 340.

In the illumination system 100', the polarization splitting film 44b and reflecting film 44c of the polarization conversion system 40 of the illumination system 100 are arrayed in the y direction.

The functions of the optical elements making up the illumination system 100' are the same as those of the illumination system 100. Thus, the illumination system 100' emits an illumination beam of linearly polarized light (s polarized light, in this example) in which the polarized components have the same polarization direction to illuminate the liquid crystal light valves 300R, 300G, 300B each constituting the illumination region 80. The incident surfaces of the liquid crystal light valves 300R, 300G, 300B are provided with polarizing plates (arranged so that the transmission axis of the polarizing plates is in alignment with the polarization axis of the light) to enhance the degree of polarization of the illuminating light. However, when the light emitted from the illumination system 100' is highly polarized, the polarizing plates may be omitted. The degree of polarization of the illuminating light referred to here means the proportion of the illuminating light that is the prescribed linearly polarized light.

The color separator 200 includes dichroic mirrors 202 and 204 and a reflecting mirror 208 which function to separate the light beam from the illumination system 100' into red, blue and green light. The first dichroic mirror 202 transmits red light components contained in the light from the illumination system 100', and reflects blue and green components. Red light transmitted by the first dichroic mirror 202 is reflected by the reflecting mirror 208 onto the cross dichroic prism 320. Red light from the color separator 200 passes via a field lens 232 to the red liquid crystal light valve 300R. The field lens 232 converts the partial light beams emitted from the illumination system 100' to light beams parallel to the central axis thereof. Field lenses 234 and 230 provided in front of the other liquid crystal light valves perform the same function.

Of the blue and green light components reflected by the first dichroic mirror 202, green light is reflected by the second dichroic mirror 204 and is thereby deflected towards the cross dichroic prism 320. The green light component emitted by the color separator 200 passes to the green liquid crystal light valve 300G via the field lens 234. The blue light component transmitted by the second dichroic mirror 204 exits the color separator 200 and impinges on the light guide system 220, in which it passes through entrance lens 222, relay lens 226, reflecting mirrors 224 and 228 and exit lens (field lens) 230, and on to the blue liquid crystal light valve 300B. The reason for using a guide system 220 for the blue light is to prevent a lowering of the light utilization efficiency caused by the fact that the optical path of the blue light is longer than that of the other colors. In other words, it is to enable the blue light to be transmitted to the exit lens 230 unchanged. The distance from the superposition lens 56 of the illumination system 100' to each of the liquid crystal light valves 300R and, 300G is set to be substantially the same.

The liquid crystal light valves 300R, 300G and 300B function as light modulator for modulating the light of each color in accordance with received image information (image signals). The cross dichroic prism 320 functions as a color combiner for combining the light of the three colors thus modulated to form a color image. The cross dichroic prism 320 comprises a red light reflecting surface 321 formed of multi-layer dielectric film stacks and a blue light reflecting surface 322 formed of multi-layer dielectric film stacks, arranged in the form of a cross. The red-reflecting dichroic surface 321 and blue-reflecting dichroic surface 322 constitute the color combining surface of the invention. Light combined by the cross dichroic prism 320 exits in the direction of the projection optical system 340, which projects the combined light to display a color image on the screen SC. It is preferable to use telecentric lenses for the projection optical system 340.

Using an illumination system 100' having a high polarization conversion efficiency improves the light utilization efficiency of the projector 1000, resulting in a brighter image display.

Using the projector 1000 with an illumination system from one of the other embodiments described above will still allow substantially the same effect to be obtained.

Figure 18A:
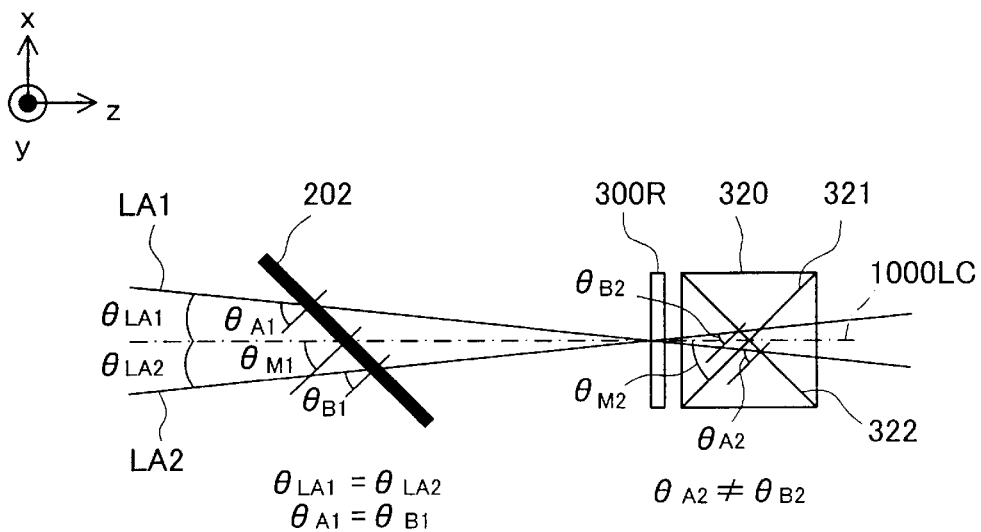
FIGS. 18(A) and 18(B) are explanatory diagrams relating to the light that travels from the illumination system 100' to the first dichroic mirror 202 and cross dichroic prism 320.
Figure 18B:
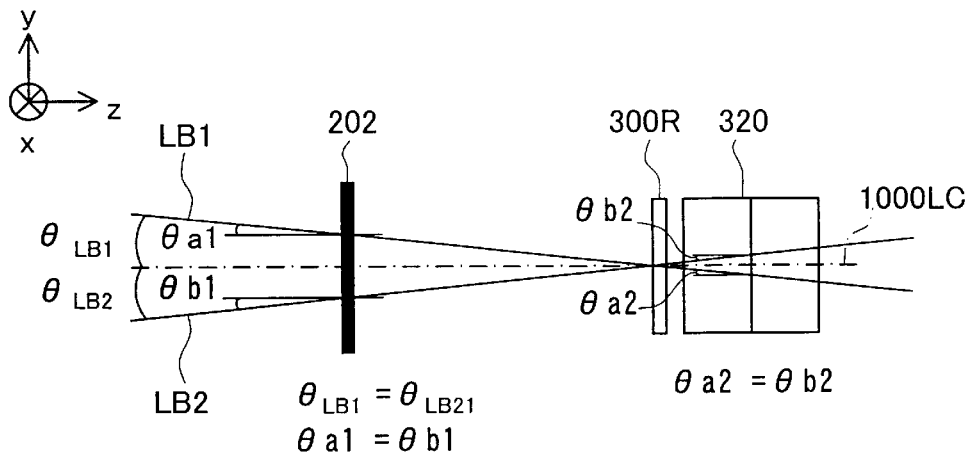

FIGS. 18(A) and 18(B) are explanatory diagrams relating to the light that goes from the illumination system 100' to the first dichroic mirror 202, second dichroic mirror 204 and cross dichroic prism 320. FIGS. 18(A) and 18(B) focus only on the first dichroic mirror 202, the red liquid crystal light valve 300R and the cross dichroic prism 320, for convenience shown arranged in a straight line. As shown, the first dichroic mirror 202 is positioned substantially perpendicular to the xz plane, forming a prescribed angle θM1 with respect to the yz plane.

Figure 19:
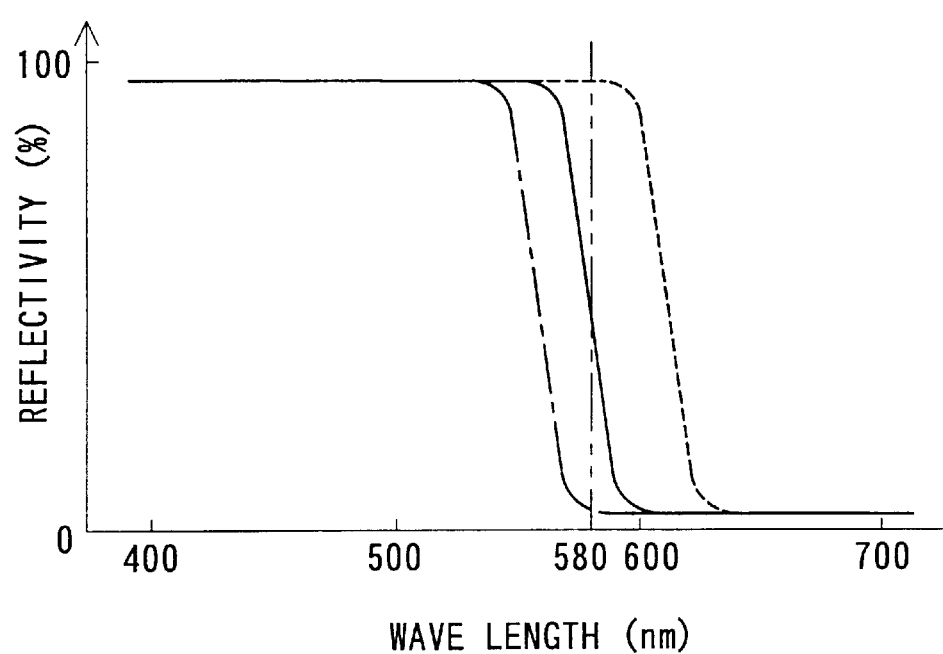
FIG. 19 shows the color separating characteristics of the first dichroic mirror 202.

FIG. 19 shows the color separating characteristics of the first dichroic mirror 202. When a light beam falls incident on the first dichroic mirror 202 at a prescribed angle θM1, the dichroic mirror 202 transmits only the red component (above approximately 580 nm) and reflects the other (blue and green) components as indicated by the solid line in FIG. 19. Deviation in the angle of incidence of light incident on the first dichroic mirror 202 results in a corresponding change in the color separating characteristics. Therefore, unless the light is made to fall incident on the first dichroic mirror 202 at the prescribed angle θM1, there will be a deviation in the red light guided to the red liquid crystal light valve 300R.

As shown in FIG. 18(A), even if two light beams LA1, LA2 are emitted from different points in the x direction at the same absolute angles θLA1, θLA2 relative to the system optical axis 1000LC, the angles of incidence θA1, θB1 of light incident on the first dichroic mirror 202 will still mutually differ and deviate from the prescribed angle θM1. For example, with respect to the light beam LA1 the result will be the type of characteristics indicated by the single-dot broken line in FIG. 19, and with respect to LA2 the type of characteristics indicated by the dashed line, instead of the required color separating characteristics represented by the solid line. Specifically, if there exists within the xy plane obliquely incident light having an angle of incidence θLA1, θLA2 relative to the system optical axis 1000LC, the color separating characteristics of the first dichroic mirror 202 will show a change that is proportional to the widening of the angle of incidence, giving rise to asymmetrical color deviation along the x axis of red light guided to the red liquid crystal light valve 300R.

On the other hand, as shown in FIG. 18(B), if two light beams LB1, LB2 are emitted from different points in the y direction at the same absolute angles θLB1, θLB2 relative to the system optical axis 1000LC, the absolute angles of incidence θa1, θb1 with respect to the first dichroic mirror 202 will also be the same, so that the color separating characteristics with respect to light beams LA1 and LA2 will also be the same. For example, the characteristics with respect to both the beams LB1 and LB2 will be those indicated in FIG. 19 by the single-dot broken line. Specifically, if there exists within the yz plane obliquely incident light having an angle of incidence θLA1, θLA2 relative to the system optical axis 1000LC, the color separating characteristics of the first dichroic mirror 202 will show a change that is proportional to ½ the widening of the angle of incidence, giving rise to symmetrical color deviation along the y axis of red light guided to the red liquid crystal light valve 300R. However, an important point is that the effect that obliquely incident light in the yz plane has on the color separating characteristics of the dichroic mirror is less than the effect of obliquely incident light in the xz plane. As a result, the effect of color deviation in the y direction in the case of red light transmitted via the first dichroic mirror 202 to the red liquid crystal light valve 300R is less than the effect of such color deviation in the x direction.

This shows that with respect to the angle at which a light beam emerges from the illumination system relative to the system optical axis 1000LC, it is preferable for the angle to be smaller in the x direction than the angle in the y direction.

In the polarization conversion system 40 of the illumination system 100', each of the partial light beams exiting from the power variation optical relay system 30 is divided into two beams in the direction in which the polarization splitting film 44b and reflecting film 44c are arrayed, which is the y direction. The density of the luminous flux emitted by the illumination system 100' is higher in the y direction than in the x direction, so compared to the effect of the beams of light flux arrayed in the x direction, beams arrayed in the y direction tend to have more of an effect on optical systems or optical elements in which the optical characteristics have an angular dependency. Also, as described with reference to the seventh embodiment, the size of the polarized light splitting system can be reduced in the direction perpendicular to the direction in which the polarized light is split in the polarization conversion system 40, so that the inclination of beams of light flux in the plane corresponding to the direction in which polarized light is split (the yz plane) becomes greater than the inclination of beams of light flux in the plane (xz plane) perpendicular to the direction in which the polarized light is split, and therefore the effect on optical systems or optical elements having optical characteristics with an angular dependency tends to become larger.

The above explanation for the first dichroic mirror 202 also applies to the second dichroic mirror 204.

Based on the above, in the projector 1000 it is preferable to use an illumination system where the polarization conversion system 40 splits the linearly polarized light components in the y direction rather than in the x direction. That is, when the illumination system of this invention is applied to an apparatus that includes a dichroic mirror, it is preferable that the direction in which polarized light is split in the polarization conversion system be arranged at right-angles to the direction in which light is separated into two colors by the dichroic mirror. This will advantageously decrease color variations in the projected images.

Since the projector 1000 uses an illumination system 100' in which the polarization conversion system 40 splits linearly polarized light components in the y direction, color variations will be reduced in the projected images.

The above explanation given with reference to the dichroic mirror also applies to the red-reflecting dichroic surface 321 and blue-reflecting dichroic surface 322 of the cross dichroic prism 320. Specifically, as shown in FIG. 18(A), even if two light beams LA1, LA2 are emitted from different points along the x axis at the same absolute angles θLA1, θLA2 relative to the system optical axis 1000LC, the angles of incidence θA2, θB2 of light incident on the red-reflecting dichroic surface 321 will still mutually differ and deviate from the prescribed angle θM2. On the other hand as shown in FIG. 18(B), if two light beams LB1, LB2 fall incident on the red-reflecting dichroic surface 321 from different points along the y axis at the same absolute angles θLB1, θLB2 relative to the system optical axis 1000LC, the absolute angles of incidence θa2, θb2 with respect to the first dichroic mirror 202 will be the same.

Therefore, when the illumination system of this invention is applied to an apparatus that includes a cross dichroic prism, it is preferable that the direction in which the polarized light is split in the polarization conversion system be arranged at right-angles to the direction in which light is separated into two colors by the dichroic prism.

Since the projector 1000 uses an illumination system 100' in which the polarization conversion system 40 splits linearly polarized light components in the y direction, color variations will be reduced in the projected images.

While the projector 1000 has been described with reference to an apparatus for displaying color images, it can also be applied to a projector for displaying monochrome images.

K. Tenth Embodiment

Figure 20:
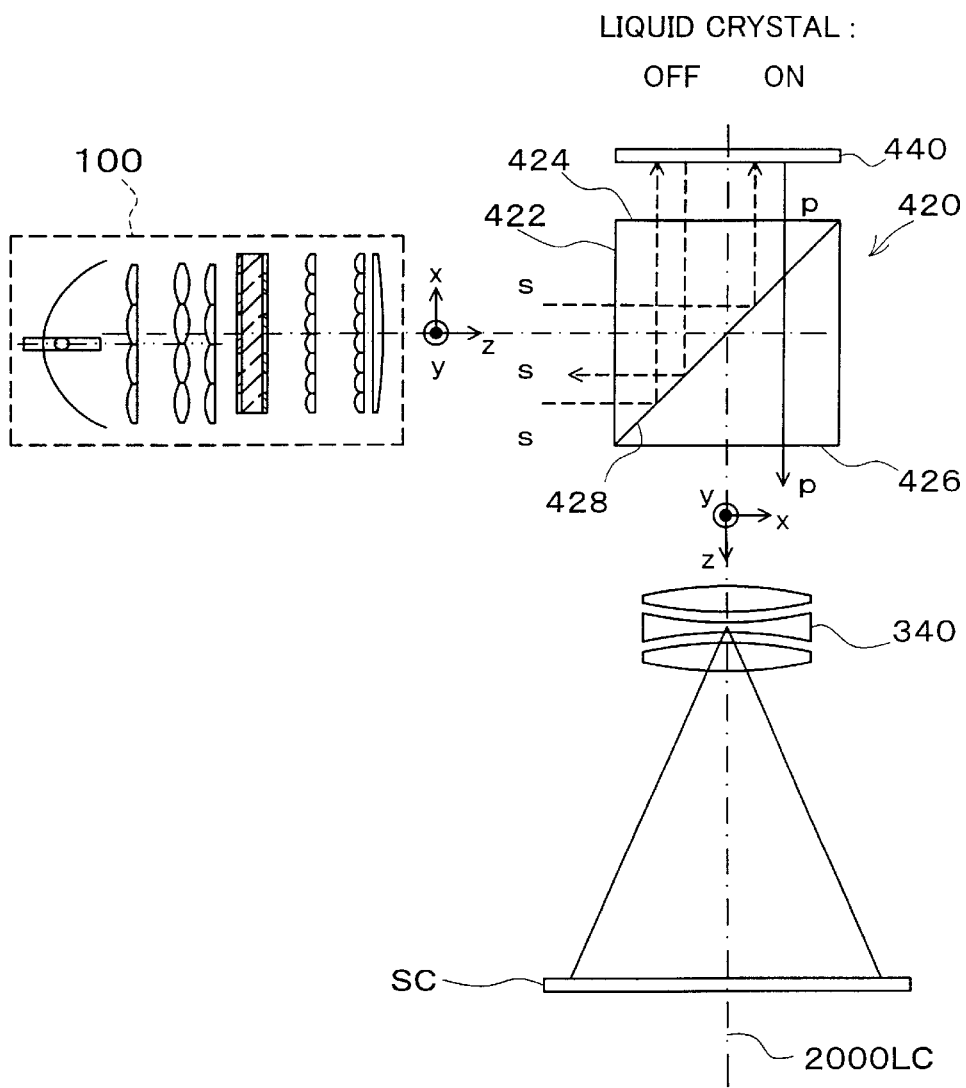
FIG. 20 is a plan view of the general configuration of main parts of another projector that uses the illumination system of the invention.

FIG. 20 is a plan view of the general configuration of main parts of another projector that uses the illumination system of the invention. This projector 2000 uses the illumination system 100 of the first embodiment.

The projector 2000 includes the illumination system 100, a polarization splitting prism 420, a reflection type liquid crystal light valve (liquid crystal panel) 440 and a projection optical system 340. The reflection type liquid crystal light valve 440, polarization splitting prism 420 and projection optical system 340 are disposed in that order on the system optical axis 2000LC.

Linearly polarized light in an s polarized state emitted from the illumination system 100 enters the polarization splitting prism 420 via a side surface 422 that is parallel to the system optical axis 2000LC and falls incident on a polarization splitting film 428. The polarization splitting film 428 reflects s polarized light and transmits p polarized light, so s polarized light incident on the polarization splitting film 428 is reflected out through a side surface 424 that faces the light valve 440.

Light incident on the light valve 440 is reflected back out in the opposite direction to the direction of incidence. When the liquid crystal is fully off, light exiting the light valve 440 is s polarized light, which enters the polarization splitting prism 420 and is again reflected by the polarization splitting film 428. As a result, light coming from the light valve 440 does not impinge on the projection optical system 340 but exits from the side surface 422 that faces the illumination system 100, resulting in a dark display on the screen SC. When the liquid crystal is fully on, light exiting from the light valve 440 is converted to p polarized light and is therefore transmitted by the polarization splitting film 428. As a result, light coming from the light valve 440 exits from the side surface 426 and impinges on the projection optical system 340, producing a light screen display. When the liquid crystal is in an intermediate state between on and off, the intermediate state includes both s and p polarized light, producing a half-tone display.

In this way, the projector 2000 uses light emitted from the illumination system 100 to switch the liquid crystal of each pixel of the light valve 440 on and off in accordance with received image information, and thereby display images on the screen.

With the projector 2000 of this tenth embodiment, also, the light utilization efficiency can be increased by using an illumination system having a high polarized light conversion efficiency, enabling the display of bright images.

Substantially the same effect can be obtained with a projector 2000 using one of the illumination systems used in the other embodiments described in the foregoing.

The polarization splitting prism 420 corresponds to the polarization splitting device of the claimed invention.

The projector 2000 has been described with reference to illumination light from the illumination system 100 being reflected by the polarization splitting prism 420 onto the light valve 440. However, an arrangement may instead be used wherein the illumination light from the illumination system 100 is transmitted by the polarization splitting prism 420 onto the reflection type liquid crystal light valve 440, and the light reflected by the reflection type liquid crystal light valve 440 is reflected by the polarization splitting prism 420 onto the projection optical system 340.

Figure 21:
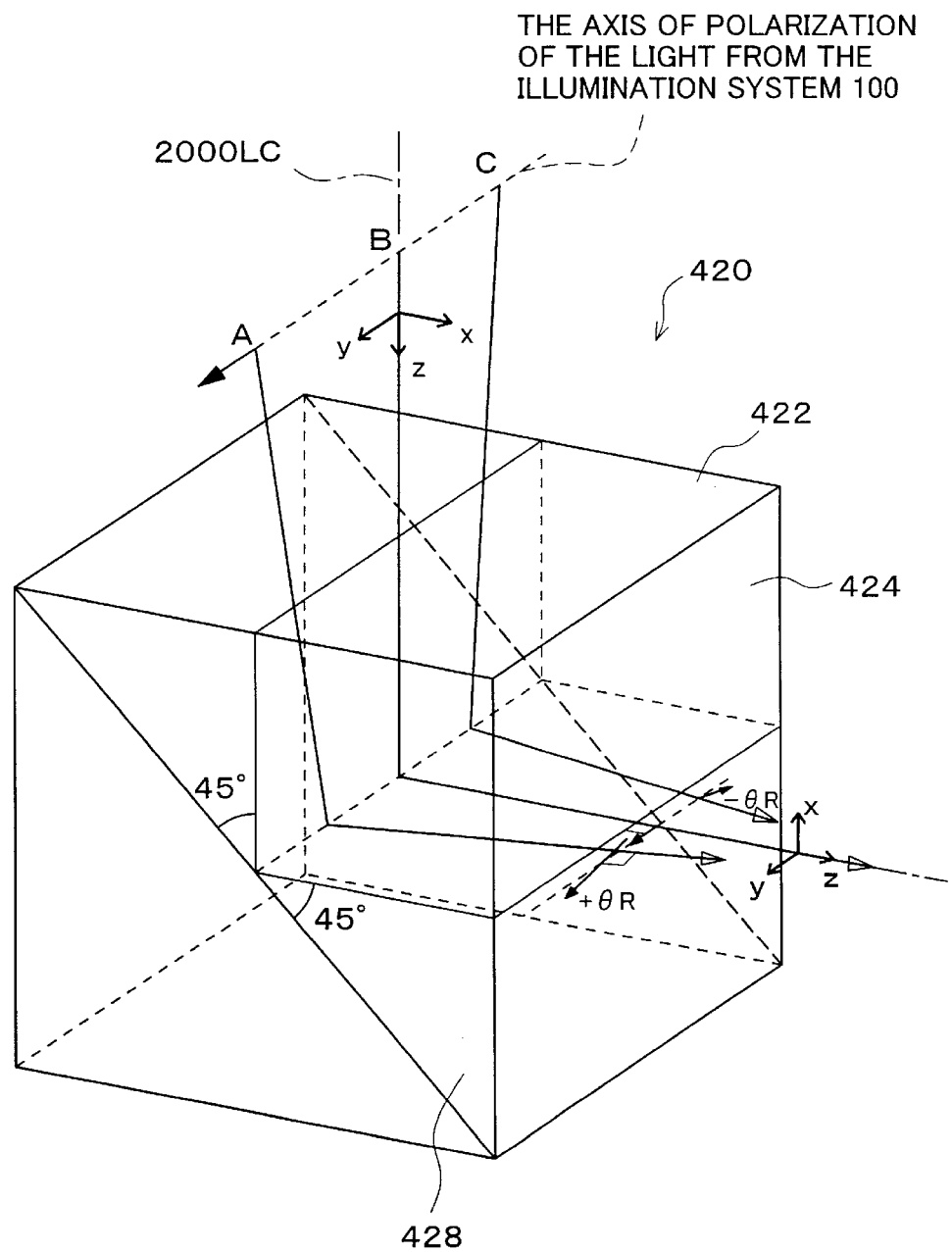
FIG. 21 is an explanatory diagram relating to the light incident on the polarization splitting prism 420.

FIG. 21 is an explanatory diagram relating to the light incident on the polarization splitting prism 420. Here, the explanation focusses on light in the yz plane. Light B is light beam that falls perpendicularly incident on the side surface 422 (that is, along a line normal to the side surface 422 or along the z axis), and light A and light C are obliquely incident light beams that are incident at an angle to the normal line of the light incident surface 422. If the axis of polarization of the light incident on the side surface 422 is perpendicular to the direction in which polarized light is split by the polarization splitting film 428 (the z and x directions), that is, if the axis of polarization is the y direction, the light, whether A, B or C, will be deflected through 90 degrees by being reflected by the polarization splitting film 428, and will therefore exit from the side surface 424. Since the light B falls perpendicularly incident on the incident surface 422, the orientation of the axis of polarization of the light B reflected out of the side surface 424 by the polarization splitting film 428 will be in the y direction. However, in the case of light A and C, which are obliquely incident on the incident surface 422, when looking at the polarization splitting prism 420 from the z direction, the polarization axis of light emerging from the side surface 424 will not coincide with the y axis but will be rotated +θR (light A), −θR (light C) relative to the y axis. Here, counterclockwise rotation is taken as positive. If light falls incident on the polarization splitting film 428 at an inclined angle with respect to the z axis within a plane (plane yz) that is perpendicular to the direction in which the polarized light is split by the polarization splitting film 428 (the x and z axis directions), the polarization axis of light reflected by the polarization splitting film 428 will be rotated regardless of the polarized light splitting characteristics of the polarization splitting film 428. This means that even if linearly polarized light falls incident on the polarization splitting prism 420 after the polarization axis has been set beforehand, if part of the linearly polarized light is obliquely incident relative to the side surface 422, light exiting the side surface 424 and falling incident on the reflection type liquid crystal light valve 440 will include undesired linearly polarized light component and degrade the brightness and contrast of projected images.

Therefore, it is preferable for the light emitted by the illumination system to have a smaller inclination in the y direction relative to the system optical axis 2000LC, that is, in a direction perpendicular to the direction in which the polarized light is split by the polarization splitting film 428.

As described above, the density of the luminous flux emitted by the illumination system is higher in the direction in which the polarization conversion system 40 splits the polarized light than at right-angles thereto. Therefore, compared to beams of light flux running at right-angles to the direction in which the polarized light is split, beams of light flux aligned in the direction in which the polarized light is split tend to have a stronger effect on optical systems or optical elements in which the optical characteristics have an angular dependency. Moreover, as described with reference to the seventh embodiment, the size of the polarized light splitting system can be reduced in the direction perpendicular to the direction in which the polarization conversion system 40 splits the polarized light, so that the inclination of beams of light flux in the plane including the direction in which the polarized light is split tends to have a greater effect on optical systems or optical elements having optical characteristics with an angular dependency than the inclination of beams of light flux in the plane perpendicular to the direction in which the polarized light is split.

Based on the above, in the projector 2000 of the tenth embodiment it is preferable to use an illumination system in which the polarization conversion system 40 splits linearly polarized light components in the same direction as the polarization splitting prism 420, that is, in the x direction. In other words, when the illumination system of this invention is applied to a projector comprised of a reflection type liquid crystal light valve and a polarization splitting prism, it is preferable that the direction in which polarized light is split in the polarization conversion system of the illumination system coincide with the direction in which the polarization splitting prism splits the polarized light. This will be advantageously improve the polarization conversion efficiency of the polarization splitting prism and increase the brightness and contrast of the projected images.

While the projector 2000 has been described with reference to an apparatus for displaying monochrome images, it can also be applied just as effectively to a projector for displaying color images.

L. Eleventh Embodiment

FIG. 22 is a plan view of the general configuration of main parts of another projector that uses the illumination system of the invention.

The projector 3000 includes an illumination system 100', three dichroic mirrors 500R, 500G and 500B, a transmission type color liquid crystal light valve (liquid crystal panel) 520 and a projection optical system 340. The dichroic mirrors 500R, 500G and 500B reflect red (R), green (G) and blue (B) light, respectively, and transmit other colors. The mirrors 500R, 500G, 500B are arranged in that order on the side near the illumination system 100', in a mutually non-parallel relationship. The dichroic mirrors do not have to be arranged in that order, but their arrangement is determined on the basis of the pixel configuration of a single-panel type color liquid crystal light valve 520, described later. Also, a reflecting mirror can be used instead of the dichroic mirror that is farthest from the illumination system 100' (dichroic mirror 500B, in this embodiment).

The dichroic mirrors 500R, 500G and 500B are located close to the intersection between the system optical axis 100LC of the illumination system 100' and the projection system optical axis 3000LC that runs through the center of the single-panel type color liquid crystal light valve 520, with the normal line of the mirror surface of the green-reflecting dichroic mirror 500G and the optical axis 100LC of the illumination system 100' forming an angle of 45 degrees. The red-reflecting dichroic mirror 500R is rotated clockwise about the y axis, setting it at a slight angle to the dichroic mirror 500G. The blue-reflecting dichroic mirror 500B is also rotated slightly about the y axis to set it at a slight angle to the dichroic mirror 500G. The angles are explained later.

Of the light emitted from the illumination system 100', red light is reflected by the dichroic mirror 500R onto the light valve 520. After being transmitted by the dichroic mirror 500R, green light is reflected by the dichroic mirror 500G, going through the dichroic mirror 500R and onto the light valve 520. Blue light passes through the dichroic mirrors 500R and 500G, and is then also reflected by the dichroic mirror 500B to reach the light valve 520. As the three dichroic mirrors are not parallel to each other, the light reflected by each dichroic mirror falls on the light valve 520 at a different angle of incidence.

FIGS. 23(A) and 23(B) are enlarged depictions of one pixel configuration of the single-panel type color liquid crystal light valve 520. As shown in FIG. 23(A), the light valve 520 includes a light valve portion 530 comprising a plurality of pixels, and a micro-lens array 540 provided on the incident surface of the light valve portion 530. Each pixel 531 of the light valve portion 530 includes three color sub-pixels 531R, 531G, 531B corresponding to red (R), green (G) and blue (B). The incident surface of each pixel 531 is provided with one micro-lens 541. The light beams of three colors impinging on the single-panel type color liquid crystal light valve 520 at different angles of incidence are each converged by the individual micro-lenses 541 of the micro-lens array 540 onto the corresponding sub-pixels 531R, 531G, 531B, and each sub-pixel modulates the color light in accordance with image information signals applied to the system.

The angles of incidence of the light of each color on the light valve 520, corresponding to the angles of the three dichroic mirrors, are set so that the light of each color impinges on the corresponding pixel 531. These angles are determined in accordance with the spacing PD between the sub-pixels 531R, 531G, 531B and the focal distance $f\mu$ of the micro-lenses 541.

Light exiting each of the pixels 531 of the light valve 520 of FIG. 22 is projected by the projection optical system 340 to display a color image onto the screen SC.

With the projector 3000 of this tenth embodiment, also, the light utilization efficiency can be increased by using an illumination system 100' having a high polarized light conversion efficiency, enabling the display of bright images.

Moreover, substantially the same effect can be obtained with a projector 3000 that uses one of the illumination systems used in the other embodiments described above.

As explained with reference to the seventh embodiment, the size of the polarized light splitting system can be reduced in the direction perpendicular to the direction in which the polarized light is split in the polarization conversion system 40, so that the inclination of beams of light flux in the plane including the direction in which polarized light is split (the yz plane) has a greater effect on optical systems or optical elements having optical characteristics with an angular dependency than the inclination of beams of light flux in the plane (xz plane) perpendicular to the direction in which the polarized light is split. Furthermore, since the density of the luminous flux emitted by the illumination system 100 is higher in the y direction than in the x direction, compared to the effect of the beams of light flux arrayed in the x direction, beams arrayed in the y direction tend to have more of an effect on such optical systems or optical elements in which the optical characteristics have an angular dependency. There is an inverse relationship between beam divergence angle and beam condensing properties. A small convergence image cannot be formed with a light beam having a large angle of divergence. Accordingly, the larger the angle of divergence of the light used to illuminate a liquid crystal light valve, the lower the light utilization efficiency of the light valve or projection optical system.

As shown in FIG. 23(B), the sub-pixels 531R, 531G, 531B constituting one pixel 531 of the light valve 520 each has a rectangular shape that is extended in the y direction, resulting in a substantially square pixel 531, when viewed from the z direction. Therefore, by using an arrangement which matches the shape of the sub-pixels with optical characteristics such as the angle of divergence or the convergence of the light beam incident thereon, it becomes possible to prevent such a decrease in the light utilization efficiency even when, as in the case of the illumination system 100', the beam emitted by the illumination system has a relatively large angle of divergence in a specific direction. Specifically, the direction in which the beam from the illumination system 100 exhibits a large angle of divergence is preferably set to coincide with the longer sides of the rectangular sub-pixels. With such an arrangement, the converged image is small in the x direction and relatively large in the y direction, enabling light of each color to impinge on the corresponding sub-pixel.

Accordingly, in the projector 3000 of the eleventh embodiment the direction in which polarized light is split in the polarization conversion system 40 is set to coincide with the longer sides of the rectangular sub-pixels used in the liquid crystal light valve. As a result, the light of each color impinges only on the corresponding sub-pixel, making it possible to obtain images that are bright and without color shift. In the case of a projector using light valves in which the color sub-pixels are spatially separated, a typical example being single-panel type color liquid crystal light valves, it is possible to reduce light of each color impinging on the wrong sub-pixel (degrading the color rendering of the displayed images) by aligning the direction in which the beam is widest and has the largest angle with the longer sides of the sub-pixels.

Although the above embodiments have been described with reference to the example of an illumination system that has a power variation optical relay system that includes a first lens array, a second lens array and a relay lens array, the invention is not limited thereto and can instead also be configured as described below.

FIG. 25 shows a variation of the illumination system of the invention. The illumination system 100J includes a light source 20, a power variation optical relay system 30J, a polarization conversion system 40J and a superposition optical system 50J. The power variation optical relay system 30J includes a first lens 32J, a relay lens 36J and a second lens 34J, which have the same functions as the first small lens 32a, relay lens 36a and second small lens 34a of the first embodiment.

The polarization conversion system 40J has a polarization beam splitter 44Ja and a reflecting prism 44Jb, and a $\lambda/2$ retardation plate 46J. A light beam emitted from the power variation optical relay system 30J impinges on the polarization beam splitter 44Ja and is divided into two types of linearly polarized light, such as s polarized light and p polarized light, by the polarization splitting film 44b. One type of linearly polarized light, for example p polarized light, passes through the polarization splitting film 44b and falls incident on the $\lambda/2$ retardation plate 46J, where it is converted to s polarized light and exits. The s polarized light is reflected by the polarization splitting film 44b onto the reflecting prism 44Jb, from where it is reflected by the reflecting film 44c and exits in substantially the same direction as the s polarized light emitted from the $\lambda/2$ retardation plate 46J. In this way, the light beam emitted from the power variation optical relay system 30J is converted by the polarization conversion system 40J into two light beams polarized in the same direction.

The superposition optical system 50J includes a pair of third lenses 52J and a pair of fourth lenses 54J corresponding to the third lenses 52J, positioned on the exit side of the polarization beam splitter 44Ja and reflecting prism 44Jb. Via the corresponding fourth lenses 54J and third lenses 52J, the two light beams emerging from the polarization conversion system 40J illuminate substantially the same location on the illumination region 80.

In this illumination system 100J, too, the size of the light beam emitted by the light source 20 can be reduced by the power variation optical relay system 30J, enabling the beam from the light source 20 to effectively fall incident on the polarization conversion system 40. The result is an illumination system with a high polarization conversion efficiency.

The above description was made with reference to the illumination system of the invention applied to a projector. However, this is not limitative. Instead, the illumination system of the invention can be applied to various types of apparatus.

Although a liquid crystal panel is used as an electro-optical device, any type of electro-optical devices may be used that utillizes a specific linearly polarized light for illumination.

It should be clearly understood that the above embodiments are only illustrative and not restrictive in any sense. The scope and spirit of the present invention are limited only by the terms of the appended claims.

What is claimed is:

1. An illumination system that illuminates a light incident surface of an optical device as an illumination region, the system comprising:

a light source that emits unpolarized light, a power variation optical relay system that changes a size of a light beam emitted by the light source, a superposition optical system that effects illumination of the illumination region by a given incident light beam, and a polarization conversion system that is provided at a selected position along a light path from an incident surface of the power variation optical relay system to an exit surface of the superposition optical system to convert an incident beam of unpolarized light to a light beam having a linearly polarized component with one type of polarization direction and emits the converted light beam, wherein a size of a light beam entering the polarization conversion system is reduced in a prescribed direction by the power variation optical relay system.

2. The illumination system according to claim 1, wherein the power variation optical relay system includes:

a first lens array having a plurality of first small lenses, a relay lens array having a plurality of relay lenses that is disposed on a light emission side of the first lens array, and a second lens array having a plurality of second small lenses that is disposed on a light emission side of the relay lens array, wherein the first lens array and the second lens array are disposed at conjugate points of the relay lens array, and wherein the polarization conversion system includes:

a polarization beam splitter array that has a plurality of pairs of mutually parallel polarization splitting film and reflecting film in an inclined state along the prescribed direction and separates the incident beam of unpolarized light into a plurality of partial light beams of two types of linearly polarized light, and a polarization conversion device that converts a polarization direction of a first type of linearly polarized light of the two types of linearly polarized light to a same polarization direction as a second type of linearly polarized light, wherein a light beam entering the polarization conversion device is split by the power variation optical relay system into a plurality of partial light beams, and the size of each of the plurality of partial light beams in the prescribed direction is reduced by the power variation optical relay system.

3. The illumination system according to claim 2, wherein the superposition optical system includes:

a third lens array having a plurality of third small lenses on which the plurality of partial light beams entering the superposition optical system impinge, a fourth lens array having a plurality of fourth small lenses corresponding to the plurality of third small lenses, and a superposition lens that superposes onto the illumination region a plurality of partial light beams passing through the third lens array and the fourth lens array.

4. The illumination system according to claim 3, wherein the polarization conversion system is disposed between the third lens array and the fourth lens array.

5. The illumination system according to claim 4, wherein the second lens array and the third lens array are optically integrated.

6. The illumination system according to claim 2, wherein the superposition optical system includes:

a third lens array having a plurality of small lenses that superposes the plurality of partial light beams substantially on the illumination region, and a fourth lens array having a plurality of fourth small lenses corresponding to the plurality of third small lenses.

7. The illumination system according to claim 6, wherein the polarization conversion system is disposed between the third lens array and the fourth lens array.

8. The illumination system according to claim 7, wherein the second lens array and the third lens array are optically integrated.

9. The illumination system according to claim 2, wherein the polarization conversion system is disposed between the power variation optical relay system and the superposition optical system.

10. The illumination system according to claim 2, wherein the polarization conversion system is disposed between the relay lens array and the second lens array of the power variation optical relay system.

11. The illumination system according to claim 2, wherein the plurality of first small lenses of the first lens array each has a different optical axis position in a direction perpendicular to the prescribed direction so that a plurality of partial light beams entering the polarization conversion system are mutually adjacent in at least the direction perpendicular to the prescribed direction.

12. The illumination system according to claim 11, wherein a plurality of partial light beams arrayed in the prescribed direction are each reduced in the power variation optical relay system by a reduction ratio that differs according to an array position of each partial light beam.

13. The illumination system according to claim 2, wherein the relay lenses are constituted by a composite lens comprising at least two lenses.

14. A projector for displaying projected images, comprising:

an illumination system according to any one of claims 1 to 13, an electro-optical device that converts light received from the illumination system to light for forming images responsive to image signals and emits the light thus converted, and a projection optical system that projects light emitted from the electro-optical device.

15. The projector according to claim 14, further comprising:

a color separator that separates light emitted from the illumination system into a plurality of color components, a plurality of the electro-optical devices for separately receiving each of the color components separated by the color separator, and a color combiner for combining light of each color component emitted by the plurality of electro-optical devices, wherein the projection optical system projects the combined light emerging from the color combiner.

16. The projector according to claim 15, wherein, assuming x, y, z as three mutually orthogonal directional axes where z is a direction parallel to an optical axis of light emerging from the illumination system, the color separator has a color separation surface plane that is substantially perpendicular to plane xz and is inclined by a prescribed angle with respect to plane yz, and the illumination system is positioned so that the prescribed direction in which a plurality of pairs of polarization splitting film and reflecting film included in the polarization conversion system are arrayed is substantially identical to the y direction.

17. The projector according to claim 15, wherein, assuming x, y, z as three mutually orthogonal directional axes where z is a direction parallel to an optical axis of light emerging from the illumination system, the color combiner has a color combining surface plane that is substantially perpendicular to plane xz and is inclined by a prescribed angle with respect to plane yz, and the illumination system is positioned so that the prescribed direction in which the plurality of pairs of polarization splitting film and reflecting film are arrayed is substantially identical to direction y.

18. A projector for displaying projected images, comprising:
   an illumination system according to any one of claims 1 to 13,
   a reflecting type electro-optical device that converts incident light to light for forming images responsive to received image signals while reflecting the light,
   a projection optical system that projects light emitted from the reflecting type electro-optical device, and
   a polarization splitting device that directs first linearly polarized light received from the illumination system toward the reflecting type electro-optical device and also directs toward the projection optical system second linearly polarized light that is received from the reflecting type electro-optical device and that is polarized in a direction perpendicular to the first linearly polarized light.

19. The projector according to claim 18,
   wherein, assuming x, y, z as three mutually orthogonal directional axes where z is a direction parallel to an optical axis of light emerging from the illumination system, the polarization beam splitter element has a polarized light separation surface plane that is substantially perpendicular to plane xz and is inclined by a prescribed angle with respect to plane yz, and
   the illumination system is positioned so that the prescribed direction in which a plurality of sets of polarization splitting film and reflecting film included in the polarization conversion system are arrayed is substantially identical to the x direction.

20. A projector for displaying projected images, comprising:
   an illumination system according to any one of claims 1 to 13,
   an electro-optical device that includes a plurality of pixels each including a plurality of sub-pixels corresponding to light of each of a plurality of colors and a condenser optical system comprising a plurality of small condenser lenses corresponding to each pixel, the electro-optical device converting light transmitted by each pixel to light for forming image of each pixel responsive to given image information,
   a color separator that separates light emerging from the illumination system into a plurality of color components and also directs light of each of the plurality of color components in a mutually different direction to impinge on the sub-pixels corresponding to the respective color components, and
   a projection optical system for projecting light emitted from the electro-optical device.

21. The projector according to claim 20,
   wherein, assuming x, y, z as three mutually orthogonal directional axes where z is a direction parallel to an optical axis of light emerging from the illumination system, the color separator has a plurality of color separation surface planes for selectively separating light into a plurality of color components that is substantially perpendicular to plane xz and is inclined by a different prescribed angle with respect to plane yz, and
   the illumination system is positioned so that the prescribed direction in which a plurality of pairs of polarization splitting film and reflecting film included in the polarization conversion system are arrayed is substantially identical to the y direction.

22. The projector according to claim 20, wherein the illumination system is positioned so that the prescribed direction in which a plurality of pairs of polarization splitting film and reflecting film are arrayed is substantially identical to a direction that is perpendicular to a direction in which the plurality of sub-pixels of each pixel are aligned.

* * * * *